(12) United States Patent
French et al.

(10) Patent No.: US 10,392,239 B2
(45) Date of Patent: Aug. 27, 2019

(54) LIQUID DISPENSER

(71) Applicant: Berry Plastics Corporation, Evansville, IN (US)

(72) Inventors: Jordan French, Evansville, IN (US); Scott L. Fisher, Evansville, IN (US); Steven Gift, Lititz, PA (US); John A. Vassallo, Lititz, PA (US)

(73) Assignee: Berry Plastics Corporation, Evansville, IN (US)

( * ) Notice: Subject to any disclaimer, the term of this patent is extended or adjusted under 35 U.S.C. 154(b) by 0 days.

(21) Appl. No.: 15/664,447

(22) Filed: Jul. 31, 2017

(65) Prior Publication Data

US 2018/0029863 A1    Feb. 1, 2018

Related U.S. Application Data

(60) Provisional application No. 62/368,461, filed on Jul. 29, 2016.

(51) Int. Cl.
| | |
|---|---|
| *B67D 3/00* | (2006.01) |
| *G01F 19/00* | (2006.01) |
| *B65D 1/00* | (2006.01) |
| *B65D 47/20* | (2006.01) |
| *B65D 47/26* | (2006.01) |

(52) U.S. Cl.
CPC ............. *B67D 3/0061* (2013.01); *B65D 1/00* (2013.01); *B65D 47/2031* (2013.01); *B65D 47/2037* (2013.01); *B65D 47/265* (2013.01); *B67D 3/0045* (2013.01); *B67D 3/0051* (2013.01); *G01F 19/00* (2013.01); *B65D 2215/02* (2013.01)

(58) Field of Classification Search
CPC .. B65D 35/40; B65D 83/0094; B67D 3/0045; B67D 3/0051; B67D 3/0061; G01F 19/00
USPC .... 222/153.1, 490, 207, 212, 158, 156, 157, 222/185.1, 425, 205; 141/381; 220/220, 220/222
See application file for complete search history.

(56) References Cited

U.S. PATENT DOCUMENTS

| | | | | |
|---|---|---|---|---|
| 525,753 | A | | 9/1894 | Otis |
| 1,412,329 | A | * | 4/1922 | Altenberg ............... B67D 1/125 141/360 |
| 1,825,553 | A | * | 9/1931 | Smith ................. B65D 47/2031 220/DIG. 19 |
| 2,103,194 | A | * | 12/1937 | Thorsen .................. B65D 47/42 222/107 |
| 2,219,146 | A | * | 10/1940 | Zeugner ................. B65D 41/26 141/381 |
| 2,804,103 | A | * | 8/1957 | Wall ...................... G01F 11/262 141/381 |
| 3,091,374 | A | * | 5/1963 | Schwartzman ....... G01F 11/263 222/448 |
| 3,118,578 | A | * | 1/1964 | Collins ................ B65D 47/263 215/307 |
| 3,184,782 | A | * | 5/1965 | Armour ............... B65D 47/263 215/313 |

(Continued)

*Primary Examiner* — Paul R Durand
*Assistant Examiner* — Michael J. Melaragno
(74) *Attorney, Agent, or Firm* — Barnes & Thornburg LLP

(57) ABSTRACT

A product package includes a container and a lid coupled to the container for rotation about an axis relative to the container. The product package further includes a child-resistant lock configured normally to block access to the contents of the container at the selection of an adult user.

12 Claims, 18 Drawing Sheets

(56) References Cited

U.S. PATENT DOCUMENTS

| | | | | |
|---|---|---|---|---|
| 3,246,807 A * | 4/1966 | Micallef | G01F 11/286 | 222/207 |
| 3,439,843 A * | 4/1969 | Corsette | B65D 47/242 | 222/212 |
| 3,512,681 A * | 5/1970 | Frankel | B65D 83/06 | 222/158 |
| 4,077,547 A * | 3/1978 | Donoghue | B65D 1/323 | 222/205 |
| 4,105,142 A * | 8/1978 | Morris, Jr. | B65D 81/3211 | 141/319 |
| 4,106,673 A * | 8/1978 | Donoghue | G01F 11/286 | 222/207 |
| 4,364,492 A * | 12/1982 | Kong | B65D 50/06 | 222/158 |
| 4,474,312 A * | 10/1984 | Donoghue | G01F 11/286 | 222/205 |
| 4,478,356 A * | 10/1984 | Roggenburg, Jr. | A47K 5/1208 | 222/207 |
| 4,548,524 A * | 10/1985 | Seager | A45D 34/042 | 222/205 |
| 4,550,862 A * | 11/1985 | Barker | B65D 41/26 | 222/109 |
| 4,653,676 A * | 3/1987 | Stull | B65D 47/06 | 215/321 |
| 4,705,181 A * | 11/1987 | Burke | B65D 50/041 | 215/213 |
| 4,834,251 A * | 5/1989 | Yu | B65D 41/06 | 215/222 |
| 4,875,603 A * | 10/1989 | Weinstein | B65D 35/40 | 222/205 |
| 4,930,668 A * | 6/1990 | Krall | A47K 5/122 | 222/185.1 |
| 4,941,598 A * | 7/1990 | Lambelet, Jr. | B05B 11/3004 | 222/321.6 |
| 4,951,839 A * | 8/1990 | Kong | G01F 11/26 | 141/322 |
| 4,969,581 A * | 11/1990 | Seifert | B65D 83/00 | 222/173 |
| 4,971,226 A * | 11/1990 | Donoghue | B29C 45/33 | 222/205 |
| 4,973,183 A * | 11/1990 | Shevick | A47K 5/1201 | 222/453 |
| 5,031,802 A * | 7/1991 | Joulia | B65D 47/063 | 222/205 |
| 5,060,830 A * | 10/1991 | Krall | A47K 5/122 | 222/185.1 |
| 5,076,475 A * | 12/1991 | Dutt | B65D 47/06 | 222/530 |
| 5,078,289 A * | 1/1992 | Bolton | B65D 41/265 | 215/228 |
| 5,115,950 A * | 5/1992 | Rohr | B65D 47/2031 | 215/232 |
| 5,127,553 A * | 7/1992 | Weinstein | G01F 11/288 | 222/158 |
| 5,143,236 A * | 9/1992 | Gueret | B65B 31/047 | 215/247 |
| 5,213,236 A * | 5/1993 | Brown | B65D 47/2031 | 220/203.17 |
| 5,261,567 A * | 11/1993 | Krall | B65D 1/0246 | 222/153.14 |
| 5,271,531 A * | 12/1993 | Rohr | B65D 47/0833 | 215/232 |
| 5,330,081 A * | 7/1994 | Davenport | B65D 1/323 | 222/207 |
| 5,381,930 A * | 1/1995 | Kalabakas | G01F 11/02 | 222/205 |
| 5,390,805 A * | 2/1995 | Bilani | B65D 1/32 | 137/845 |
| 5,439,143 A | 8/1995 | Brown | | |
| 5,454,494 A * | 10/1995 | Lechelle | B65D 35/46 | 222/494 |
| 5,531,363 A * | 7/1996 | Gross | B65D 47/2031 | 222/494 |
| 5,549,224 A * | 8/1996 | Wu | B65D 51/1688 | 222/158 |
| 5,655,687 A * | 8/1997 | Fitten | B65D 1/0276 | 222/185.1 |
| 5,743,443 A * | 4/1998 | Hins | B29C 45/1635 | 222/490 |
| 5,839,614 A * | 11/1998 | Brown | B65D 47/2031 | 222/185.1 |
| 5,865,330 A * | 2/1999 | Buono | B65D 50/046 | 215/216 |
| 5,868,288 A * | 2/1999 | Redmond, Sr. | B65D 1/023 | 156/DIG. 27 |
| 5,884,816 A * | 3/1999 | Hinze | B65D 41/26 | 222/158 |
| 5,884,817 A * | 3/1999 | Kaufman | A47K 5/122 | 222/185.1 |
| 5,897,033 A * | 4/1999 | Okawa | B65D 47/2031 | 222/212 |
| 5,927,566 A * | 7/1999 | Mueller | B29C 45/1676 | 222/490 |
| 5,934,514 A * | 8/1999 | Lampe | B65D 47/0804 | 215/232 |
| 5,967,377 A * | 10/1999 | Glynn | B05B 11/3004 | 222/158 |
| 5,988,413 A | 11/1999 | Nagel | | |
| 6,036,036 A * | 3/2000 | Bilani | B65D 50/046 | 215/216 |
| 6,076,689 A * | 6/2000 | Vassallo | B65D 41/04 | 215/209 |
| 6,089,411 A * | 7/2000 | Baudin | B65D 47/2031 | 222/212 |
| 6,089,418 A * | 7/2000 | Gaiser | B65D 47/2031 | 222/153.06 |
| 6,095,382 A * | 8/2000 | Gross | B65D 47/242 | 215/271 |
| 6,168,581 B1 * | 1/2001 | Buehler | B01L 3/0282 | 222/42 |
| 6,186,367 B1 * | 2/2001 | Harrold | B05B 11/04 | 222/205 |
| 6,330,960 B1 * | 12/2001 | Faughey | B65D 50/045 | 222/158 |
| 6,332,730 B1 * | 12/2001 | Taghavi-Khanghah | B65D 35/20 | 222/212 |
| 6,341,718 B1 * | 1/2002 | Schilthuizen | B05B 11/04 | 222/207 |
| 6,415,961 B2 | 7/2002 | Bonningue | | |
| 6,446,844 B1 * | 9/2002 | Gross | B65D 47/2031 | 222/212 |
| 6,530,504 B2 * | 3/2003 | Socier | B65D 47/2031 | 222/212 |
| 6,616,016 B2 * | 9/2003 | Hicks | B65D 47/0847 | 222/212 |
| 6,672,487 B1 * | 1/2004 | Lohrman | B65D 47/0804 | 222/1 |
| 6,705,492 B2 | 3/2004 | Lowry | | |
| 6,877,639 B1 * | 4/2005 | Hanson | A47J 47/01 | 222/158 |
| 6,910,607 B2 * | 6/2005 | Gaiser | B65D 47/2031 | 222/212 |
| 6,923,344 B1 | 8/2005 | Chien | | |
| 7,128,245 B2 * | 10/2006 | Lee | B65D 47/0809 | 222/212 |
| 7,152,763 B2 * | 12/2006 | Stull | B29C 45/0081 | 222/212 |
| 7,255,250 B2 * | 8/2007 | Pugne | B65D 47/0804 | 215/327 |
| 7,543,724 B2 * | 6/2009 | Brunner | B65D 41/0471 | 222/490 |
| 7,798,348 B2 * | 9/2010 | Sawyer | B65D 50/046 | 215/237 |
| 7,980,430 B2 * | 7/2011 | Hickok | B65D 47/2031 | 222/490 |
| 8,074,817 B1 | 12/2011 | Steele | | |

(56) References Cited

U.S. PATENT DOCUMENTS

| | | | | |
|---|---|---|---|---|
| 8,087,547 B1* | 1/2012 | Lindsey | B65D 35/56 | 222/1 |
| 8,608,034 B2* | 12/2013 | Bloom | B65D 47/2031 | 220/212 |
| 8,651,304 B2* | 2/2014 | Skillin | B65D 41/26 | 141/381 |
| 8,657,159 B2 | 2/2014 | Nielsen | | |
| 8,899,437 B2 | 12/2014 | Vogel | | |
| 8,919,615 B2* | 12/2014 | Szekely | A47K 5/1201 | 222/322 |
| D730,194 S | 5/2015 | Kawai | | |
| D739,750 S | 9/2015 | Luijendijk | | |
| 9,382,049 B2* | 7/2016 | Kershner | B65D 50/043 | |
| 9,580,214 B2* | 2/2017 | Hatton | B65D 47/2031 | |
| 9,849,067 B2* | 12/2017 | Vassallo | A61J 1/1418 | |
| 9,850,040 B2* | 12/2017 | Scott | B65D 41/0471 | |
| 9,975,673 B2* | 5/2018 | Prater | B65D 50/041 | |
| 2004/0232169 A1* | 11/2004 | Glover | B65D 47/0804 | 222/212 |
| 2004/0251278 A1* | 12/2004 | Arai | B65D 47/2031 | 222/212 |
| 2006/0037975 A1* | 2/2006 | Suffa | B65D 47/2031 | 222/490 |
| 2006/0113331 A1* | 6/2006 | Snyder | B65D 1/32 | 222/490 |
| 2006/0138163 A1* | 6/2006 | Danks | B65D 47/2031 | 222/1 |
| 2006/0138179 A1* | 6/2006 | Suffa | B65D 47/0804 | 222/490 |
| 2006/0185764 A1* | 8/2006 | Bronner | B65D 41/26 | 141/381 |
| 2006/0201976 A1* | 9/2006 | Bloom | B65D 47/2031 | 222/494 |
| 2008/0029548 A1* | 2/2008 | De Wree | A47K 5/122 | 222/212 |
| 2008/0237278 A1* | 10/2008 | Gaus | B65D 47/2031 | 222/630 |
| 2009/0127294 A1* | 5/2009 | Krallmann | B65D 47/063 | 222/494 |
| 2010/0051572 A1* | 3/2010 | Beecroft | B65D 50/048 | 215/216 |
| 2010/0314418 A1* | 12/2010 | Roth | B65D 41/26 | 222/205 |
| 2012/0292283 A1 | 11/2012 | Kornbrust | | |
| 2013/0160891 A1* | 6/2013 | Vassallo | B65B 3/003 | 141/27 |
| 2013/0270301 A1* | 10/2013 | Schoubben | B65D 47/30 | 222/207 |
| 2014/0263436 A1* | 9/2014 | Gelov | B65D 47/2031 | 222/92 |
| 2015/0014369 A1* | 1/2015 | Hatton | F16K 15/147 | 222/490 |
| 2015/0048114 A1* | 2/2015 | Skillin | B65D 47/0838 | 222/205 |
| 2015/0338257 A1* | 11/2015 | Fouad | G01F 11/261 | 222/1 |
| 2016/0030288 A1* | 2/2016 | Vassallo | B65D 47/0804 | 604/407 |
| 2016/0109276 A1* | 4/2016 | Larson | G01F 19/00 | 222/157 |
| 2017/0021983 A1* | 1/2017 | Bull | B65D 47/2031 | |
| 2017/0066563 A1* | 3/2017 | Geiger | B65D 47/2031 | |
| 2017/0113851 A1* | 4/2017 | Martin | B65D 50/043 | |
| 2017/0297779 A1* | 10/2017 | Im | B65D 41/26 | |

* cited by examiner

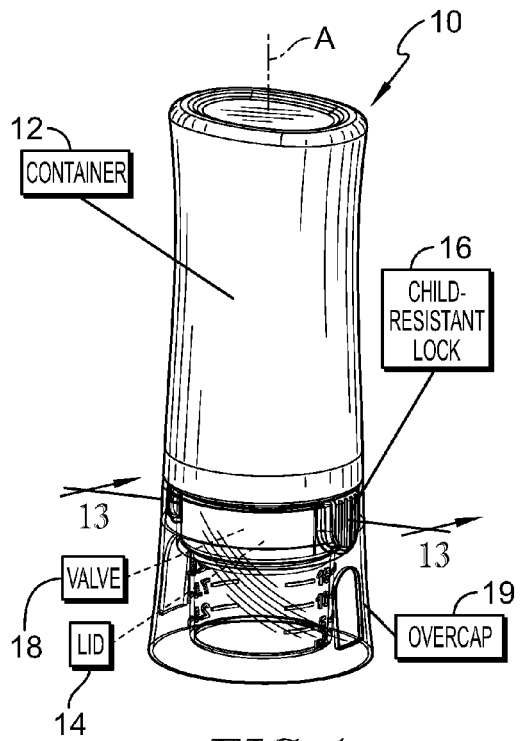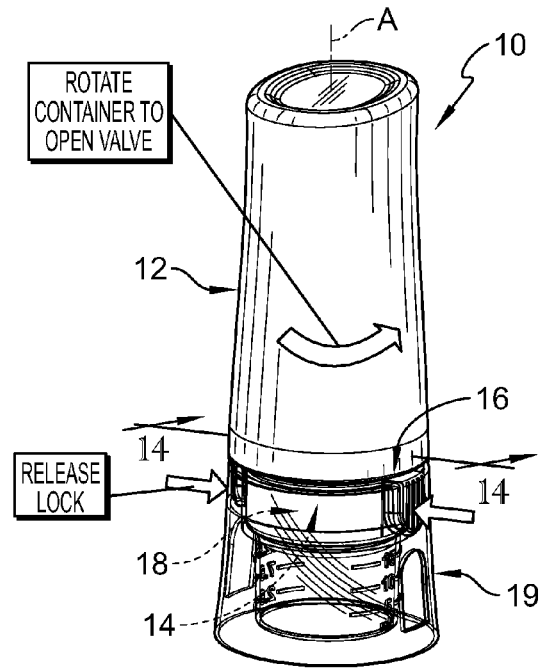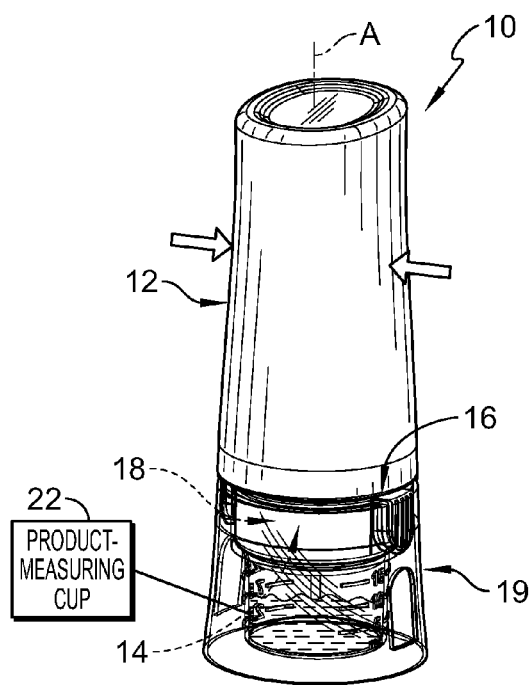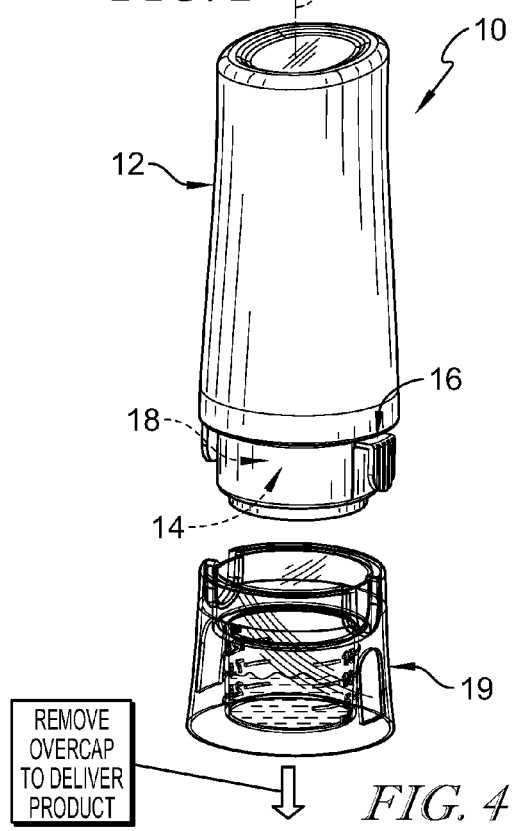

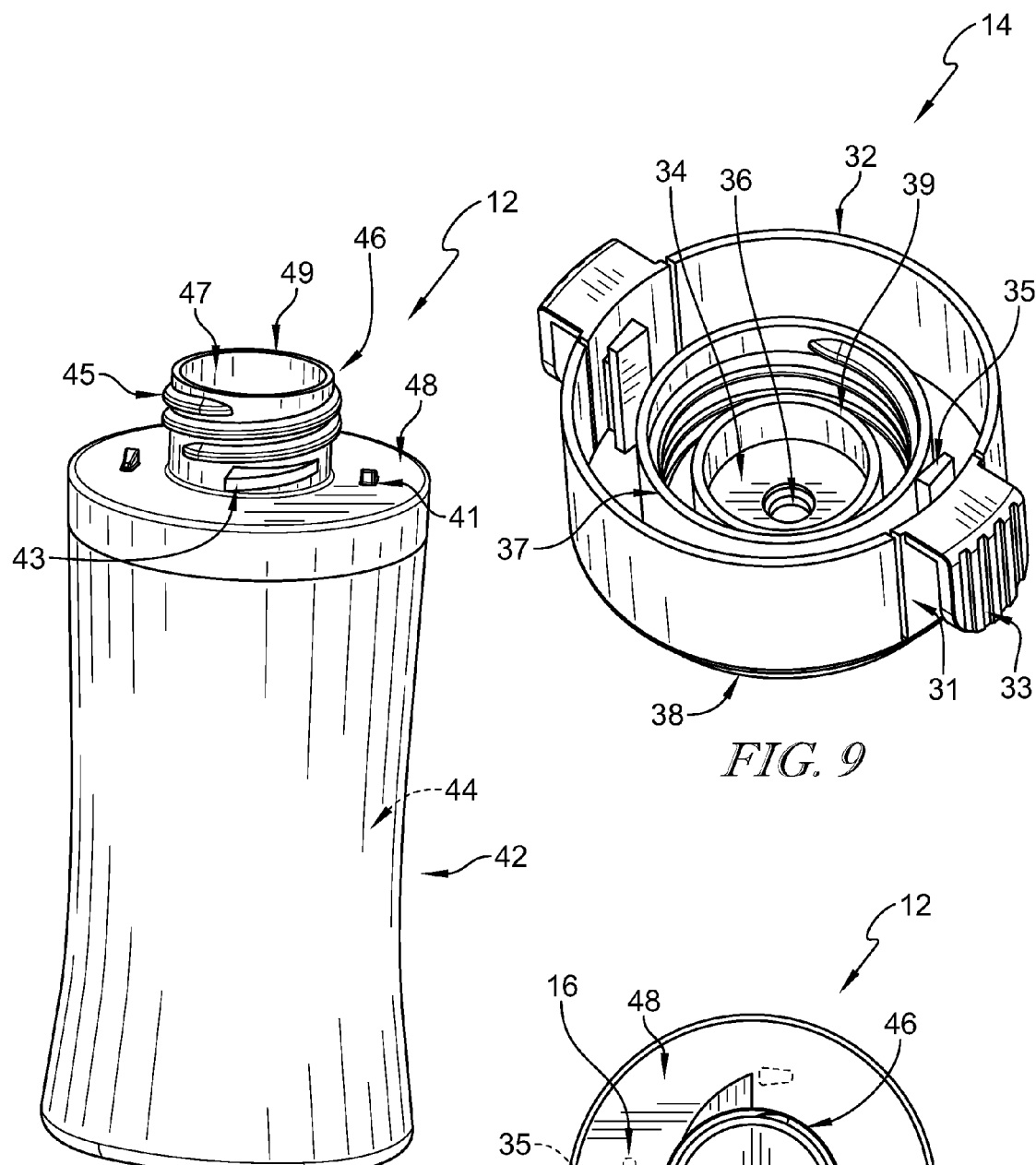

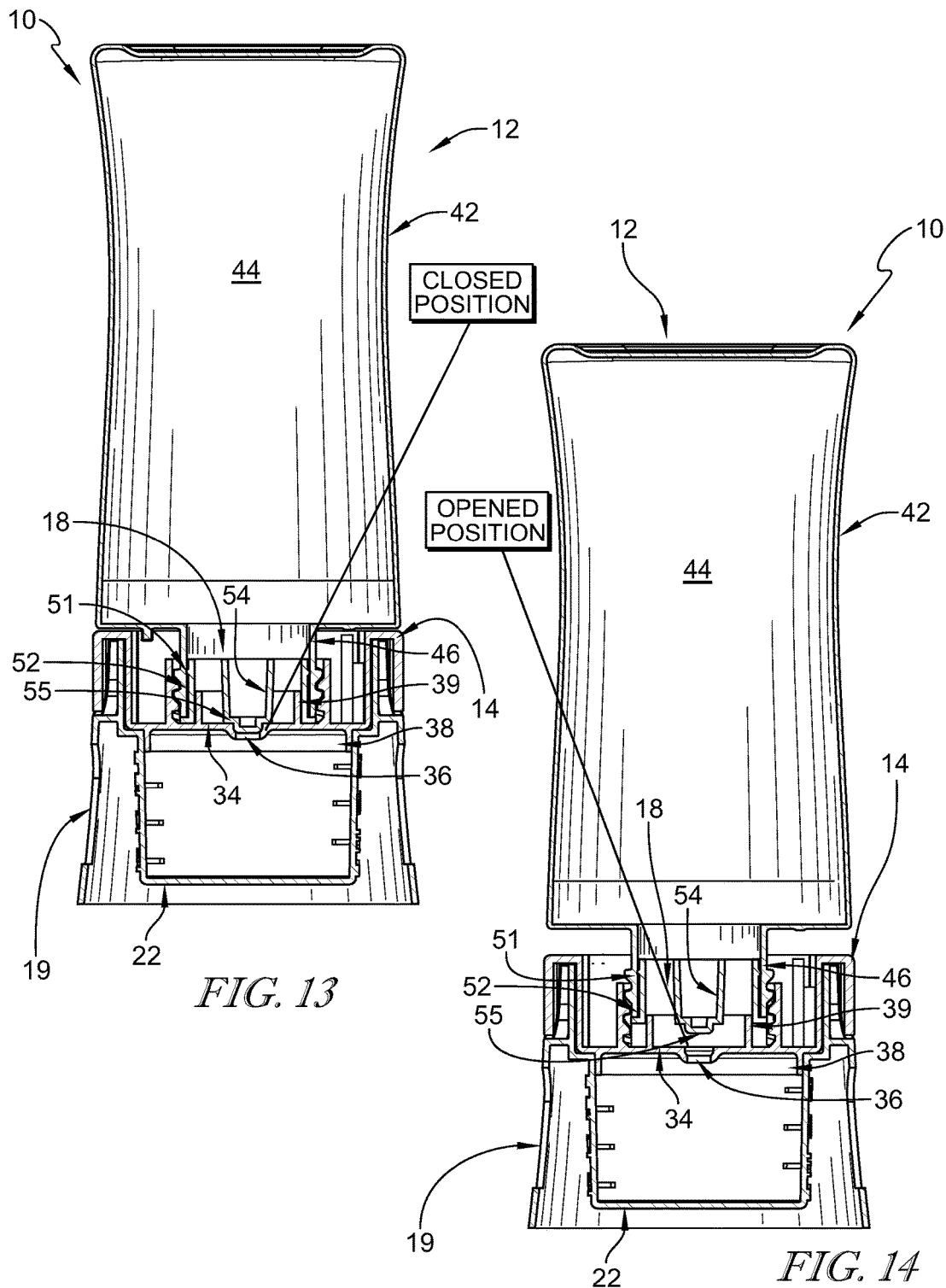

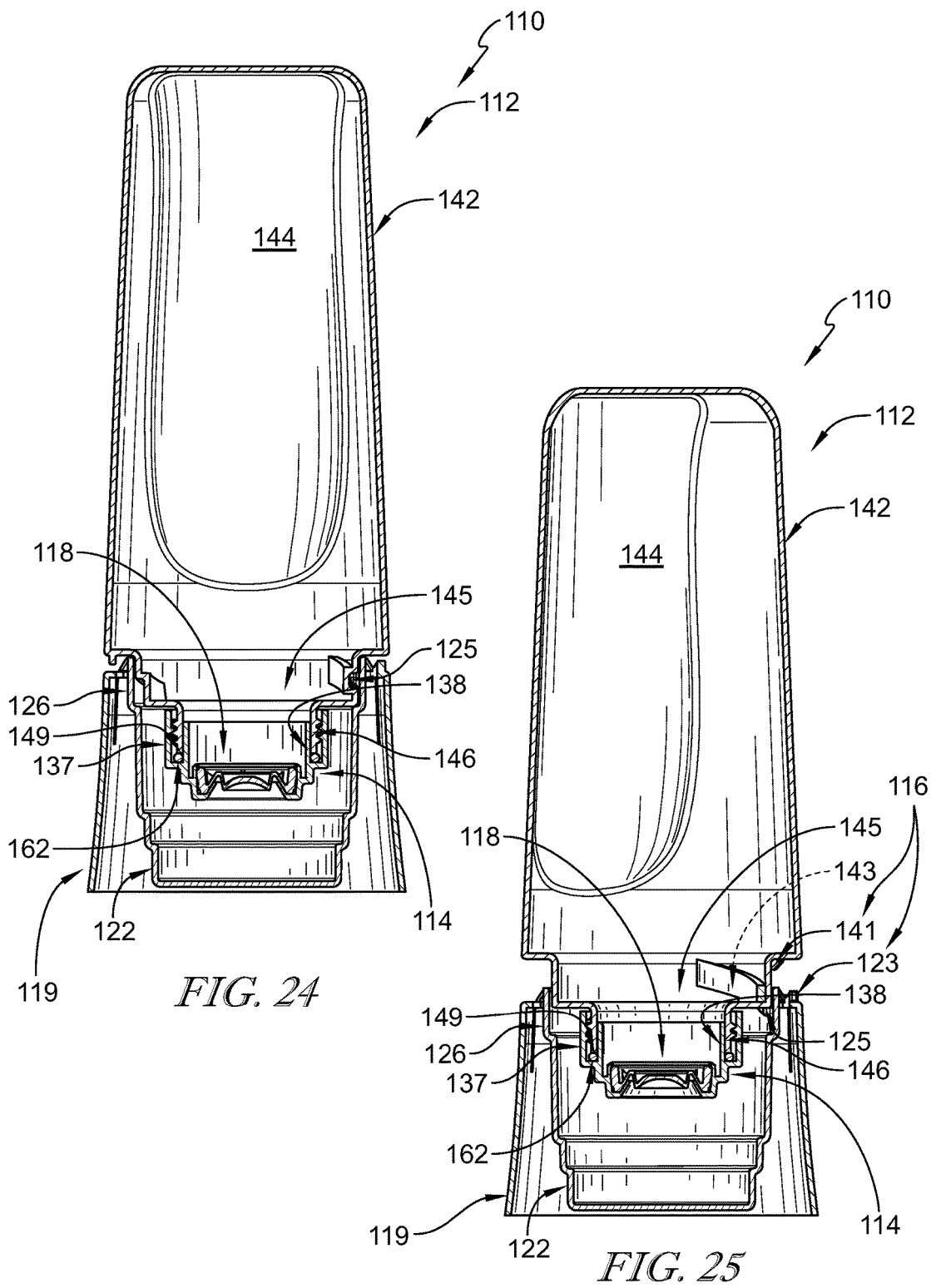

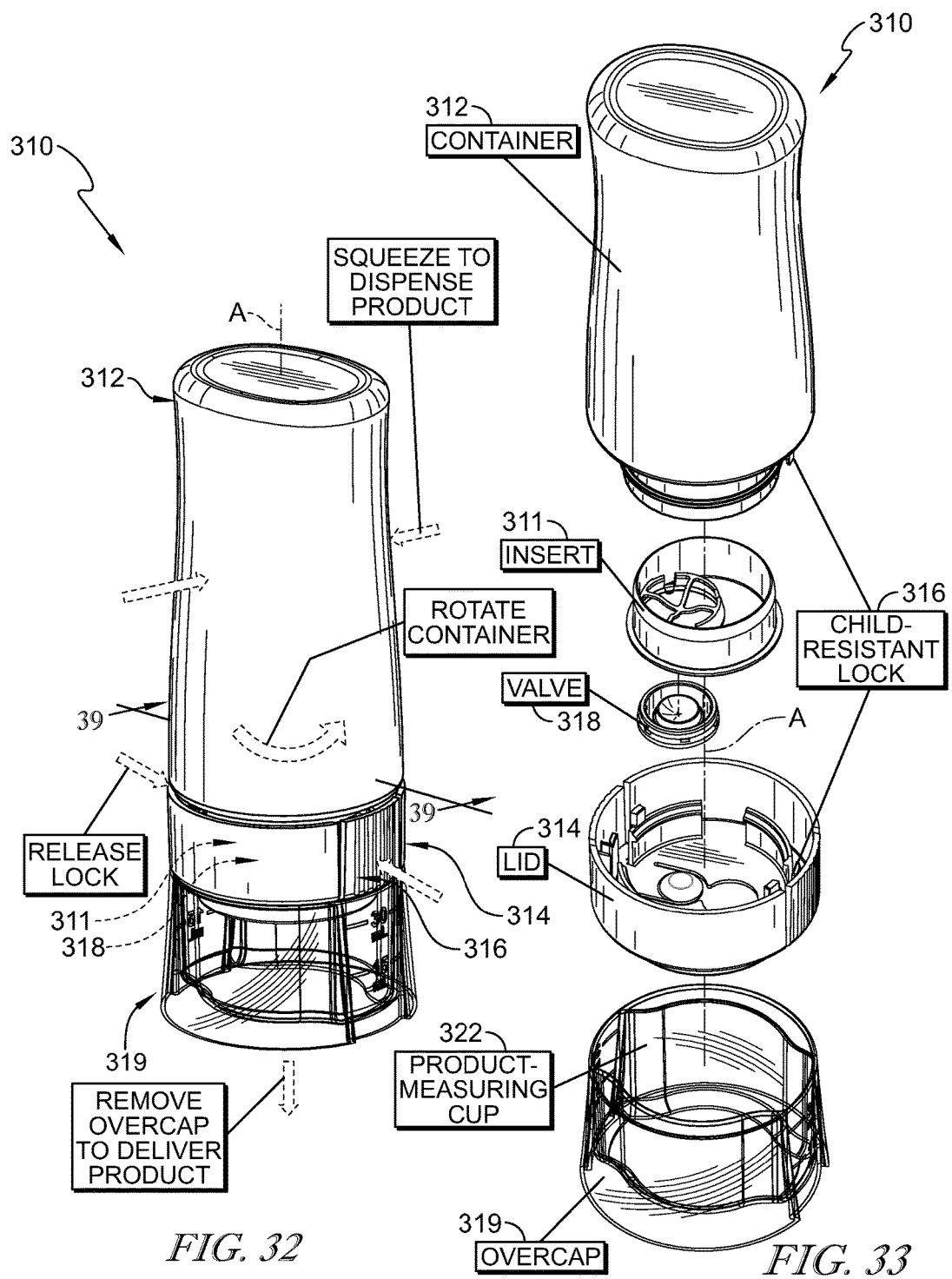

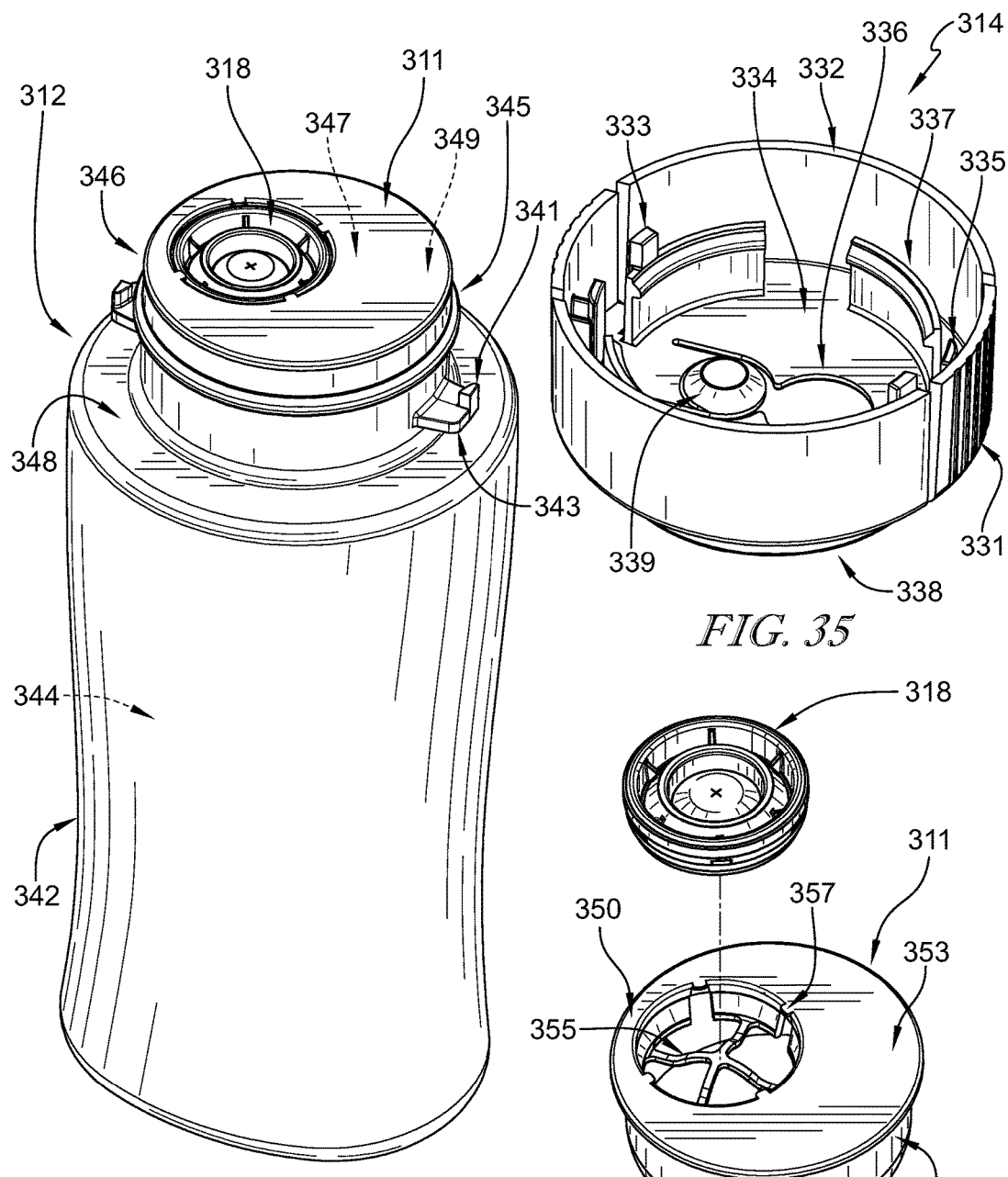

LIQUID DISPENSER

PRIORITY CLAIM

This application claims priority under 35 U.S.C. § 119(e) to U.S. Provisional Patent Application No. 62/368,461, filed Jul. 29, 2016, which is expressly incorporated by reference herein.

BACKGROUND

The present disclosure relates to a product dispenser, and particularly to liquid dispenser. More particularly, the present disclosure relates to a liquid dispenser including a child-resistant lock configured to block use of the liquid dispenser at the selection of an adult user.

SUMMARY

According to the present disclosure, a liquid dispenser includes a container and a lid mounted on the container for rotation about an axis. The liquid dispenser further includes a child-resistant lock configured to block access to the contents of the container at the selection of an adult user.

In illustrative embodiments, the container includes a body formed to include an interior product storage region therein and a valve coupled to the container to control discharge of a liquid product stored in the interior product-storage region. The lid is coupled to the container to trap the valve between the body and the lid. Discharge of liquid from the container through the valve is blocked when the lid is coupled to the container and arranged in a locked position with the child-resistant lock engaged. After the child-resistant lock is disengaged, the lid may be rotated relative to the container to cause the lid to be spaced apart from the valve and allow liquid product stored in the container to be discharged.

In illustrative embodiments, the liquid dispenser further includes an overcap. The overcap is coupled to the lid and arranged to receive the liquid product dispensed from the container through the valve into a product-measuring cup included in the overcap. In illustrative embodiments, the overcap is configured to communicate visually to a user an amount of liquid product discharged into the product-measuring cup so that the user can control an amount of liquid product discharged into the product-measuring cup.

In illustrative embodiments, the lid includes a side wall, a bottom wall coupled to the side wall, and a valve blocker coupled to the bottom wall. The bottom wall is formed to include a dispense aperture. The valve blocker is engaged with the valve to block dispensing of product out of the interior product-storage region of the container into the overcap when the lid is in the closed position. The dispense aperture is aligned with the valve to allow dispensing of product out of the interior product-storage region of the container into the overcap when the lid is in the opened position.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a liquid dispenser in accordance with a first embodiment of the present disclosure showing that the liquid dispenser includes a container, a lid mounted on the container, and an overcap mounted on the lid, and suggesting that the lid engages with a valve to block dispensing of a liquid product from the container when a child-resistant lock is engaged;

FIG. 2 is a view similar to FIG. 1 showing the container rotated relative to the lid after release of the child-resistant lock and suggesting that rotation of the container disengages the valve from the lid to allow discharge of the product from the container as suggested in FIG. 3;

FIG. 3 is a view similar to FIG. 2 showing that a product-measuring cup included in the overcap is positioned to receive the dispensed product when the overcap is mounted on the lid and suggesting that a user squeezes the container to dispense product into the product-measuring cup;

FIG. 4 is a view similar to FIG. 3 showing the overcap removed from the lid to allow a user to use the dispensed product;

FIG. 8 is a perspective view of the container of FIG. 1 showing that the neck is coupled to a platform of the body and that a pair of tab blockers included in the child-resistant lock are coupled to the platform and arranged to lie in spaced-apart relation to one another to locate the neck therebetween;

FIG. 9 is an upper perspective view of the lid of FIG. 7 showing that the child-resistant lock further includes a pair tab-mover walls coupled to the bottom wall and spaced apart from the side wall to allow movement of the tab-mover walls relative to the side wall and a pair of lock tabs coupled to the tab-mover walls to move therewith;

FIG. 10 is a diagrammatic view of the container showing that lid-rotation limiters extend radially outward from the neck and suggesting that the lock tabs (shown in phantom) are movable between locked positions which engages with the tab blockers and unlocked positions which engage with the lid-rotation limiters to limit rotation of the lid relative to the container;

FIG. 13 is a sectional view take along line 13-13 in FIG. 1 showing the valve in a closed position in which the valve stem is engaged with the lid to block dispensing of liquid product as a result of the lid being in the locked position;

FIG. 14 is a sectional view take along line 14-14 in FIG. 2 showing the valve in an opened position in which the valve stem is spaced apart from the lid to allow liquid product to pass through the dispense aperture as a result of the lid being rotated relative to the container to the unlocked position;

FIG. 24 is a sectional view take along line 24-24 in FIG. 16 showing the overcap coupled to the container and arranged in a locked position to block discharge of liquid product from the container into the overcap;

FIG. 25 is a view similar to FIG. 24 showing the overcap moved away from the container after an adult user releases the child-resistant lock to allow discharge of the liquid product into the overcap;

FIG. 32 is a perspective view of a third embodiment of a liquid dispenser in accordance with the present disclosure showing that the liquid dispenser includes a container, a lid mounted on the container, and an overcap mounted on the lid, and suggesting that the lid engages with a valve to block dispensing of a liquid product from the container when a child-resistant lock is engaged;

FIG. 33 is an exploded perspective view of the liquid dispenser of FIG. 32 showing the that the liquid dispenser includes, from top to bottom, the container, an insert, the valve, the lid, and the overcap;

FIG. 34 is a perspective view of the container of FIG. 33 showing the insert received in a neck of the container and suggesting that the insert supports the valve on the container;

FIG. 35 is an upper perspective view of the lid of FIG. 33 showing that the lid includes a bottom wall, a side wall coupled to the bottom wall, a dispense aperture formed through the bottom wall, and a valve blocker coupled to the bottom wall;

FIG. 36 is an exploded perspective view of the insert and valve of FIG. 33 showing that the insert includes a closure wall, an annular wall extending from the closure wall, and a valve seat coupled to the closure wall and having a cross member and retention tabs and suggesting that the valve is received in the valve seat;

DETAILED DESCRIPTION

Figure 5:
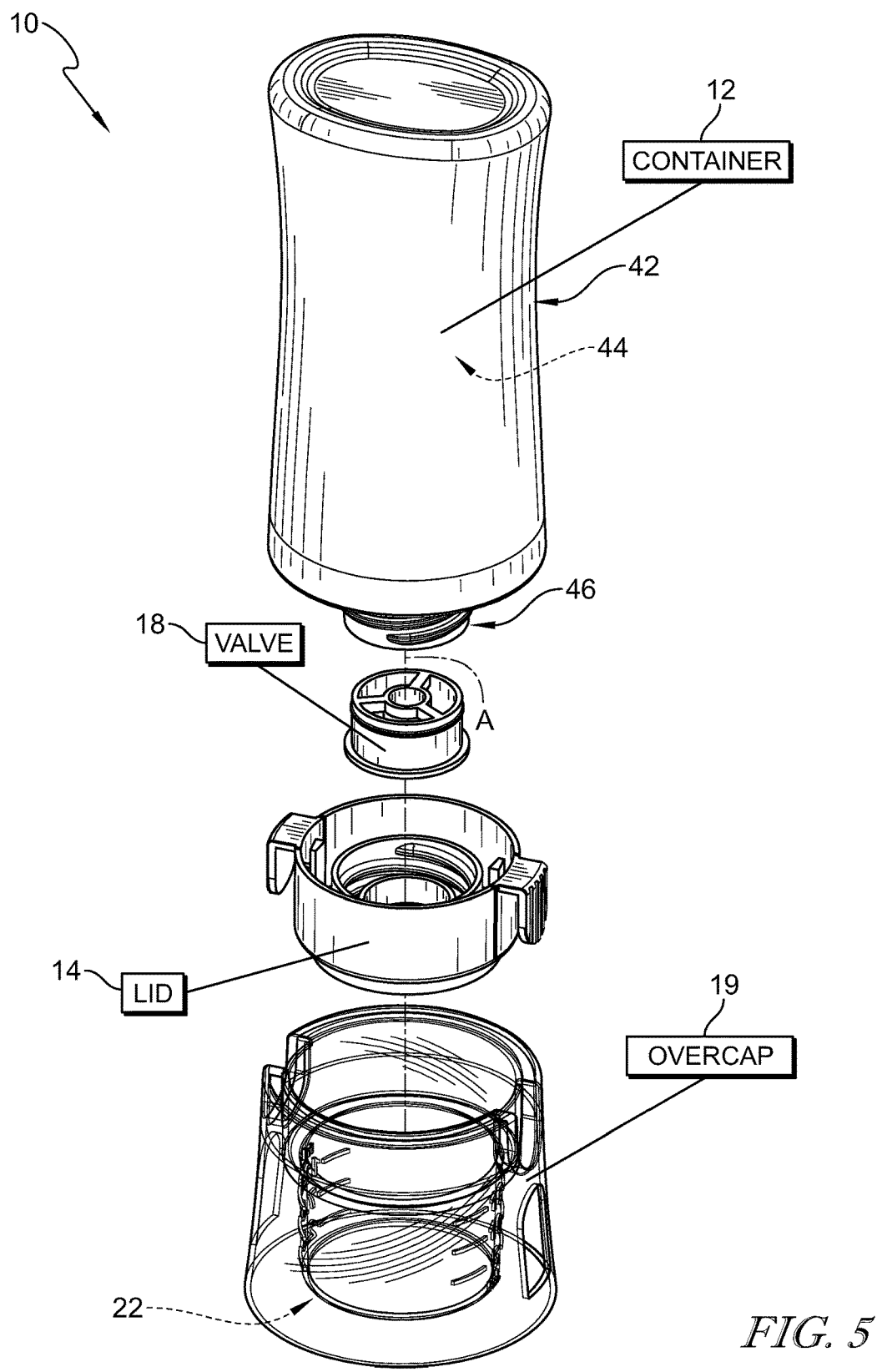
FIG. 5 is an exploded perspective view of the liquid dispenser of FIG. 1 showing the that the liquid dispenser includes, from top to bottom, the container including a body and a neck, the valve, the lid, and the overcap.

A liquid dispenser 10 in accordance with the present disclosure includes a container 12 and a lid 14 mounted on container 12 over a valve 18 as shown in FIGS. 1, 5, 13, and 14. Lid 14 is rotatable relative to container 12 about an axis A to block or allow dispensing of liquid product stored in container 12 into an overcap 19 as suggested in FIGS. 2 and 3. A child-resistant lock 16 blocks rotation of lid 14 at the selection of an adult user as suggested in FIGS. 1, 2, and 10. Liquid product dispensed into a product-measuring cup 22 of overcap 19 is delivered by removing overcap 19 from lid 14 as suggested in FIGS. 3 and 4.

Overcap 19 is configured to support liquid dispenser 10 in an upright position when overcap 19 is mounted on lid 14 as suggested in FIG. 1. An adult user releases child-resistant lock 16 and rotates container 12 relative to lid 14 to space valve 18 apart from lid 14 as suggested in FIGS. 2, 13, and 14. The user squeezes container 12 to dispense liquid product from container 12 into product-measuring cup 22 of overcap 19 to a desired level as suggested in FIG. 3. The user removes overcap 19 from lid 14 to deliver the liquid product contained in product-measuring cup 22 to the user or another person for ingestion of the product, for example.

Container 12 includes a body 42 formed to include an interior product-storage region 44 and a neck 46 coupled to body 42 as shown in FIG. 5. Valve 18 is located in a space formed in neck 46. Lid 14 is coupled to neck 46 over valve 18 to trap valve 18 between lid 14 and body 42. Overcap 19 is coupled to lid 14 such that liquid product dispensed through lid 14 flows into product-measuring cup 22.

Figure 6:
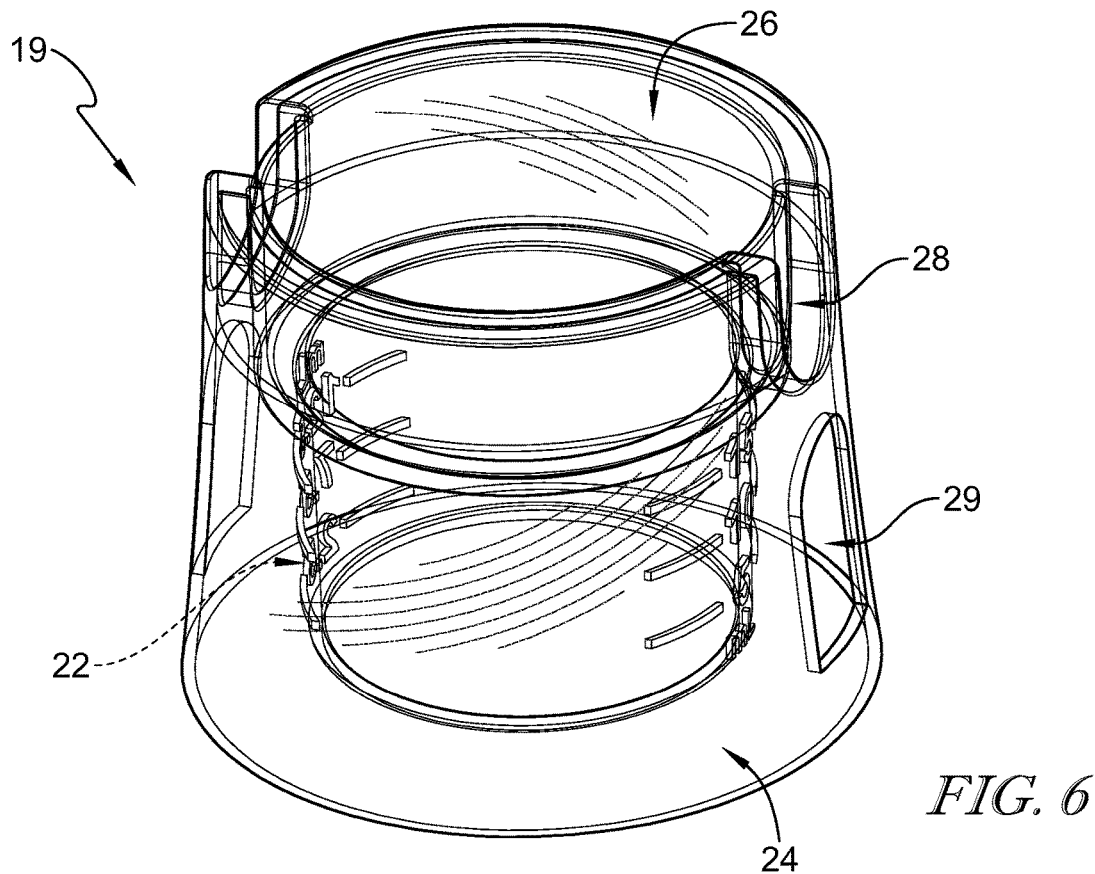
FIG. 6 is an enlarged perspective view of the overcap of FIG. 1 showing that the overcap includes the product-measuring cup and a base wall coupled to the product-measuring cup to support the product-measuring cup and liquid dispenser in an upright position when the overcap is mounted on the lid as suggested in FIG. 1.

Overcap 19 includes product-measuring cup 22 and a base wall 24 coupled to product-measuring cup 22 as shown in FIG. 6. Base wall 24 is formed to define a lid receiver 26 and grip receivers 28. Base wall 24 is also formed to include a fill-view aperture 29 to allow a user to view product-measuring cup 22 as product is dispensed into product-measuring cup 22 to allow a desired amount of product to be measured. Base wall 24 is configured to engage with a supporting surface to hold liquid dispenser 10 in an upright orientation.

Figure 7:
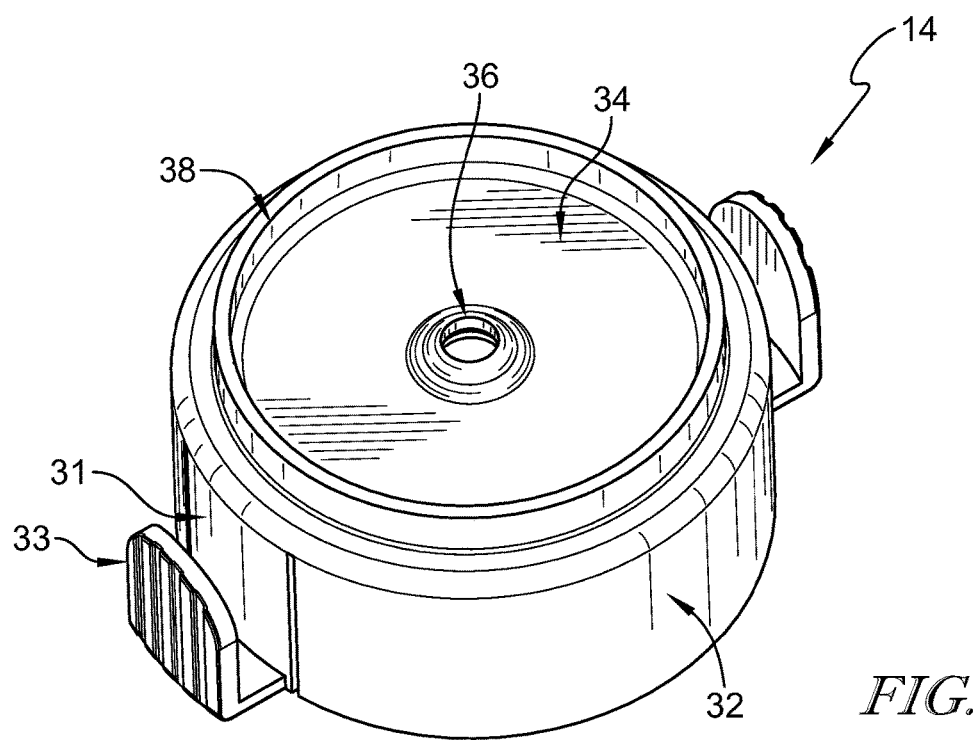
FIG. 7 is an enlarged perspective view of the lid of FIG. 1 showing that the lid includes a bottom wall formed to include a dispense aperture and a side wall coupled to the bottom to extend toward the container from the bottom wall.

Lid 14 includes a side wall 32 and a bottom wall 34 coupled to side wall 32 as shown in FIG. 7. Bottom wall 34 is formed to include a dispense aperture 36. Tab-mover walls 31 of child-resistant lock 16 are coupled to bottom wall 34 and spaced apart from side wall 32 to allow tab-mover walls 31 to flex relative to bottom wall 34 and move relative to side wall 32. Grips 33 are coupled to tab-mover walls 31 and configured to provide a grip surface for engagement of tab-mover walls 31 by a user.

Lid receiver 26 of overcap 19 is configured to receive side wall 32 of lid 14 as suggested in FIGS. 6 and 7. A cup sealer 38 coupled to bottom wall 34 is configured to form a plug seal with product-measuring cup 22 when overcap 19 is mounted on lid 14 to block product within product-measuring cup 22 from passing out of product-measuring cup 22 before overcap 19 is removed from lid 14. In another example, the plug seal minimizes the spilling of liquid and the communication of air between product-measuring cup 22 and atmosphere surrounding liquid dispenser 10 when overcap 19 is coupled to lid 14. In one example, the plug seal minimizes the spilling of liquid while allowing atmosphere to be communicated between product-measuring cup 22 and atmosphere surrounding liquid dispenser 10 when overcap 19 is coupled to lid 14. Grip receivers 28 are configured to receive grips 33 and allow radial movement of grips 33 relative to overcap 19.

Body 42 of container 12 is formed to define a platform 48 as suggested in FIG. 8. Neck 46 is coupled to platform 48. A brim 49 of neck 46 defines an opening 47 arranged to open into interior product-storage region 44 of container 12. In one example, tab blockers 41 are coupled to platform 48 and spaced apart from neck 46. Lid-rotation limiters 43 extend radially outward from neck 46. In some embodiments, tab blockers 41 are coupled to neck 46. In some embodiments, lid-rotation limiters 43 are coupled to platform 48.

Lock tabs 35 are coupled to tab-mover walls 31 of lid 14 to move therewith as suggested in FIG. 9. A lid anchor 37 coupled to bottom wall 34 is configured to engage with neck 46 to mount lid 14 onto container 12 as suggested in FIGS. 8 and 9. In one example, threads 45 are coupled to neck 46 and configured to engage with corresponding threads of lid anchor 37. However, any other suitable attachment arrangements may be used in accordance with the present disclosure. A valve receiver 39 is also coupled to bottom wall 34 and configured to engage with valve 18 when lid 14 is mounted on container 12.

In one example, lid-rotation limiters 43 each include a ramp wall 57 and a blocker wall 58 as suggested in FIG. 10. Ramp wall 57 is configured to engage with lock tab 35 to move lock tab 35 radially outward as lid 14 is coupled to container 12. Blocker wall 58 is configured to engage with lock tab 35 to block removal of lid 14 from container 12 once lid 14 is coupled on container 12. Lid 14 is in the opened position when lock tab 35 engages blocker wall 58.

Tab blocker 41 is configured to move lock tab 35 radially inward as lid 14 is further coupled onto container 12 as suggested in FIG. 10. Lock tab 35 engages with tab blocker 41 to form child-resistant lock 16 when lid 14 reaches the closed position. Child-resistant lock 16 blocks rotation of lid 14 toward the opened position at the selection of an adult user. An adult user releases child-resistant lock 16 by moving lock tab 35 radially inward to pass around tab blocker 41 and allow rotation of lid 14 toward the opened position. Lock tab 35 illustratively travels along a path P as lid 14 rotates between the opened and closed positions.

Figure 11:
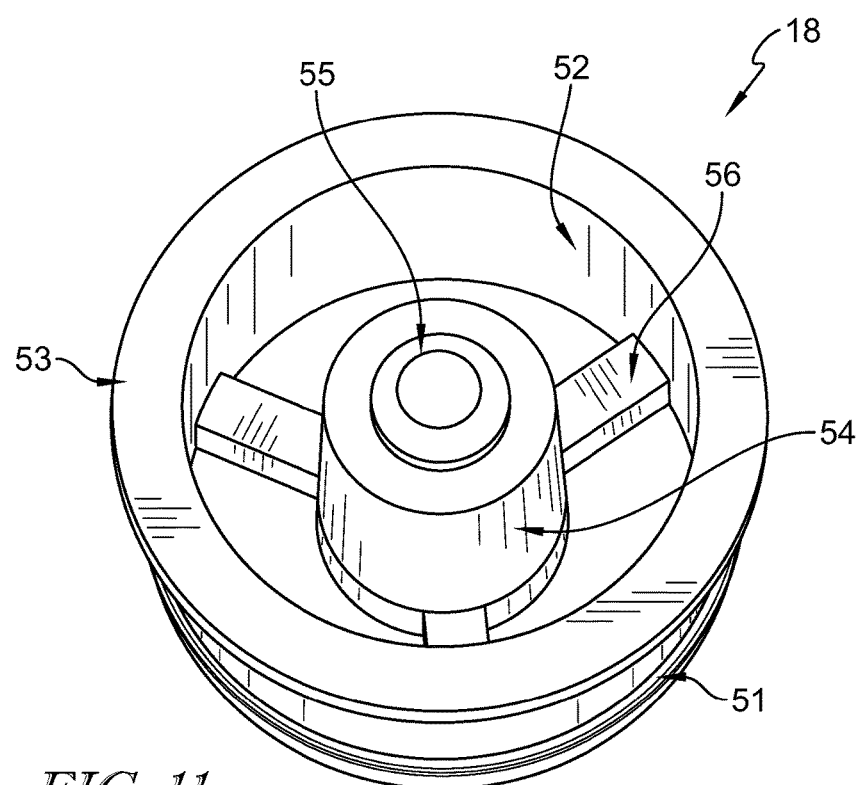
FIG. 11 is a lower perspective view of the valve of FIG. 1 showing that the valve includes an annular wall and a valve stem coupled to the annular wall by webs to space the valve stem from the annular wall.
Figure 12:
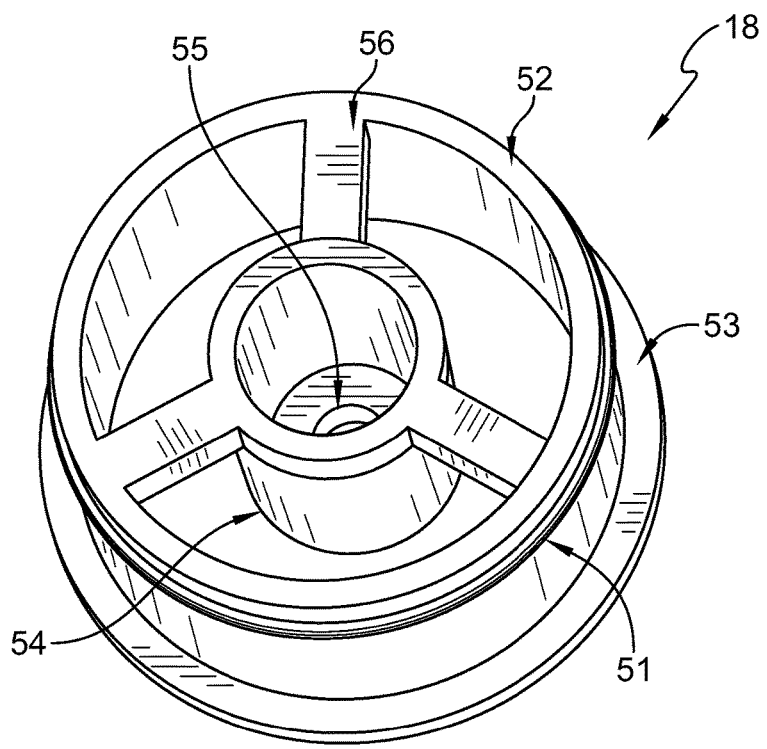
FIG. 12 is an upper perspective view of the valve of FIG. 11 showing a rib extending outward from the annular wall to engage with the neck of the container to seal the valve against the neck and a flange coupled to a lower end of the annular wall to engage with a brim of the neck to position the valve relative to the neck.

Valve 18 includes an annular wall 52 and a stem 54 coupled to annular wall 52 by webs 56 as suggested in FIGS. 11 and 12. Stem 54 is spaced apart from annular wall 52 and extends from webs 56 to a tip 55. A rib 51 extends radially outward from annular wall 52 and is configured to engage and seal against an inner surface of neck 46 of container 12. A flange 53 is coupled to annular wall 52 and extends radially outward. Flange 53 is configured to engage with brim 49 of neck 46 to limit insertion of valve 18 into neck 46. In some embodiments, flange 53 forms a seal with brim 49.

Tip 55 of stem 54 engages with bottom wall 34 to cover dispense aperture 36 and block product from passing through dispense aperture 36 when lid 14 is in the closed position as suggested in FIG. 13. Tip 55 is spaced apart from bottom wall 34 when lid 14 is in the opened position to allow product within interior product-storage region 44 of container 12 to pass through neck 46, valve 18, and dispense aperture 36 into product-measuring cup 22 as suggested in FIG. 14. Valve receiver 39 forms a plug seal with annular wall 52 of valve 18 when lid 14 is in the opened and closed positions. In some embodiments, one or more additional lock features are included in liquid dispenser 10 to block removal of overcap 19 from lid 14 until lid 14 is returned to the closed position after dispensing product into product-measuring cup 22.

In illustrative embodiments, container 12, lid 14, valve 18, and overcap 19 are formed from plastics materials, such as polyethylene terephthalate, polypropylene, polyethylene, or polyvinyl chloride, combinations thereof, or any other suitable alternative. In some embodiments, overcap 19 is formed from a transparent material to allow a user to see product-measuring cup 22 through base wall 24. In some embodiments, container 12 is printed or shrink wrapped to include indicia regarding the product.

Figures 15, 16:
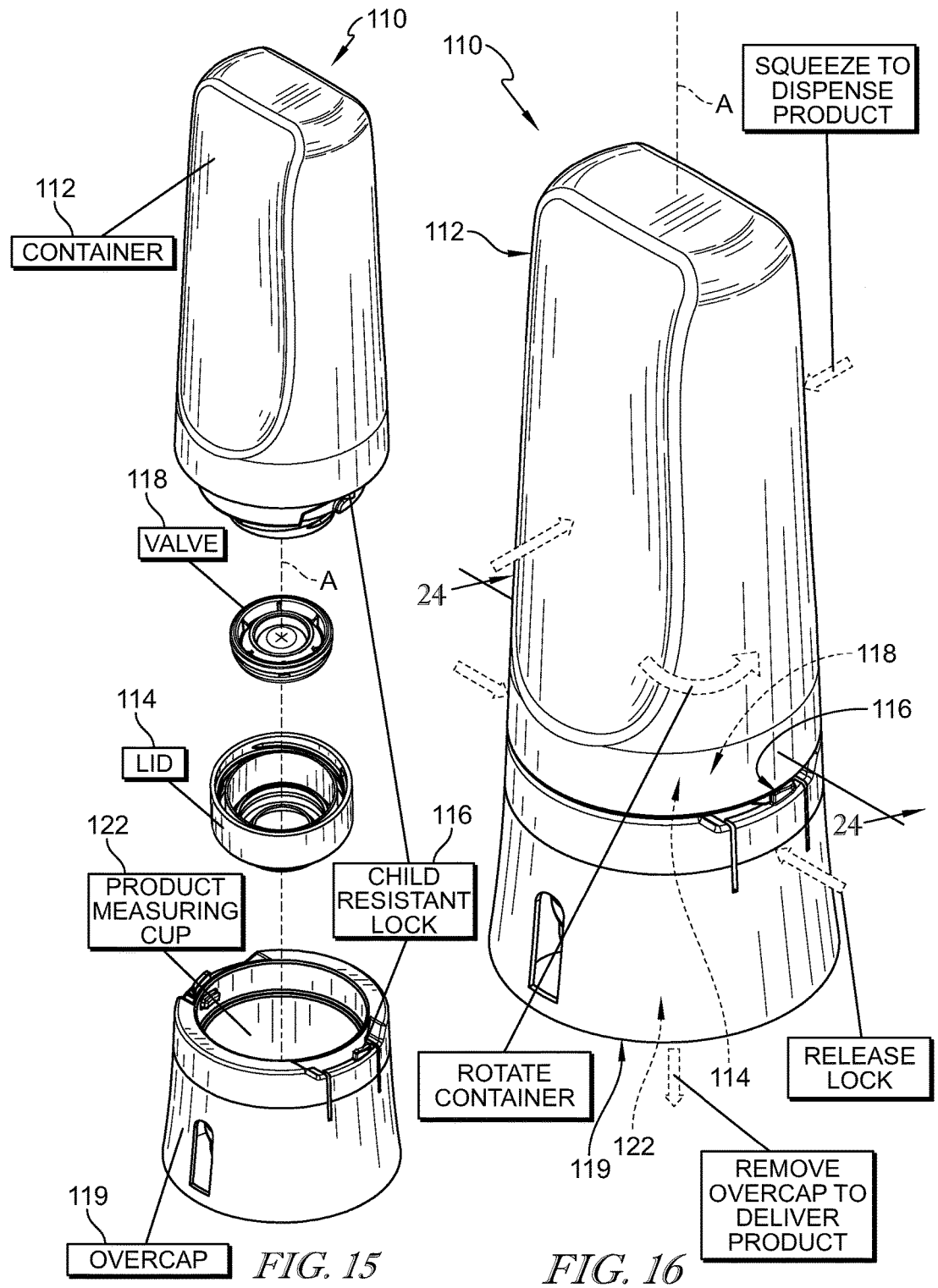
FIG. 15 is an exploded perspective view of a second embodiment of a liquid dispenser in accordance with the present disclosure showing that a child-resistant lock is formed between an overcap and a container to block removal of the overcap from the container at the selection of a user and suggesting that a valve is received in a lid which is coupled to the container to control dispensing of liquid product from the container.
FIG. 16 is a perspective view of the package of FIG. 15 showing the overcap mounted on the container and suggesting that liquid product within the container is dispensed into the overcap which is removable at the selection of a user by releasing the child-resistant lock and rotating the container relative to the overcap.

Another embodiment of a liquid dispenser 110 in accordance with the present disclosure includes a container 112 and an overcap 119 configured to be mounted on container 112 as suggested in FIGS. 15 and 16. A valve 118 is received in a lid 114 which is coupled to container 112 to control discharge of a product from within container 112. A child-resistant lock 116 is formed between overcap 119 and container 112 to block removal of overcap 119 from container 112 at the selection of an adult user. Overcap 119 is rotatable relative to container 112 about an axis A to block or allow delivery of product within overcap 119.

Overcap 119 is configured to support liquid dispenser 110 in an upright position when overcap 119 is mounted on container 112 as suggested in FIG. 16. An adult user squeezes container 112 to dispense product from container 112 into a product-measuring cup 122 of overcap 119 to a desired level. The user releases child-resistant lock 116 and rotates container 112 relative to overcap 119 to allow removal of overcap 119 from container 112. The user removes overcap 119 from container 112 to deliver the product contained in product-measuring cup 122 to the user or another person for ingestion of the product, for example.

Figure 17:
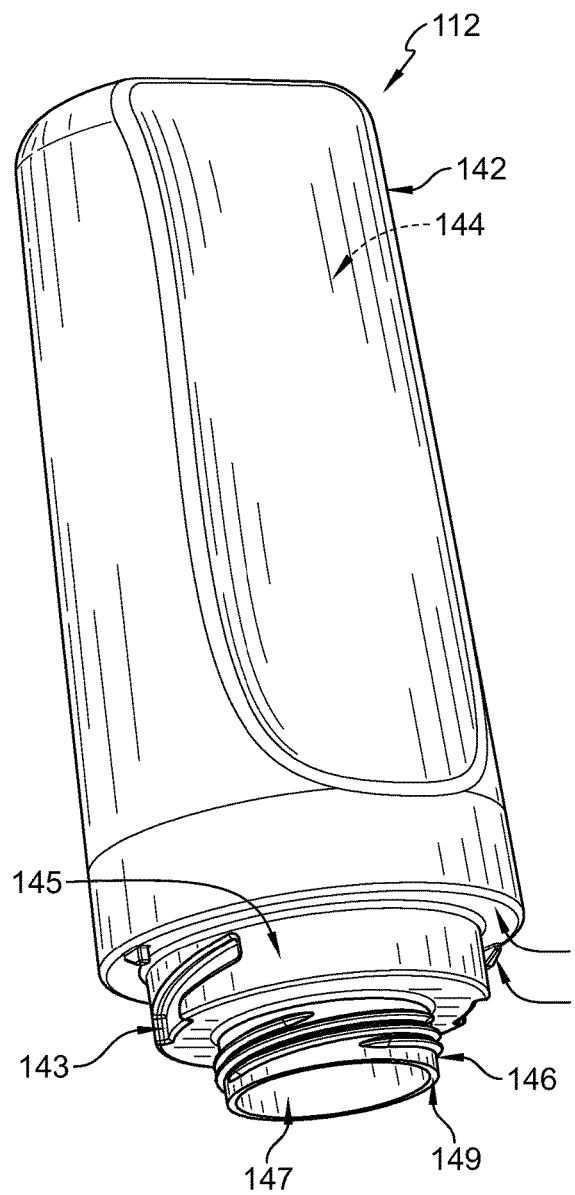
FIG. 17 is a perspective view of the container of FIG. 15 showing that tab blockers are coupled to a platform of the container as part of the child-resistant lock.

Container 112 includes a body 142 defining an interior product-storage region 144 of container 112, a mount ring 145 coupled to body 142, and a neck 146 coupled to mount ring 145 as shown in FIG. 17. A brim 149 of neck 146 defines an opening 147 into interior product-storage region 144 of container 112. Body 142 is includes a platform 148. In one example, tab blockers 141 are coupled to platform 148 and spaced apart from neck 146. Mount ring 145 is formed to include grooves 143 extending at least partially along a perimeter thereof.

Figure 18:
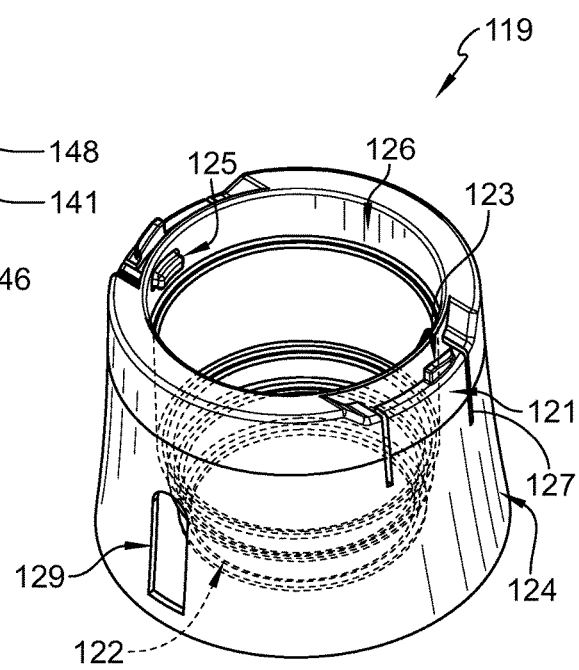
FIG. 18 is an upper perspective view of the overcap of FIG. 15 showing that the overcap includes the product-measuring cup and a base wall coupled to the product-measuring cup to support the package in an upright position when mounted on the lid as suggested in FIG. 15 and that lock tabs are coupled to tab-mover walls of the overcap as part of the child-resistant lock.
Figure 19:
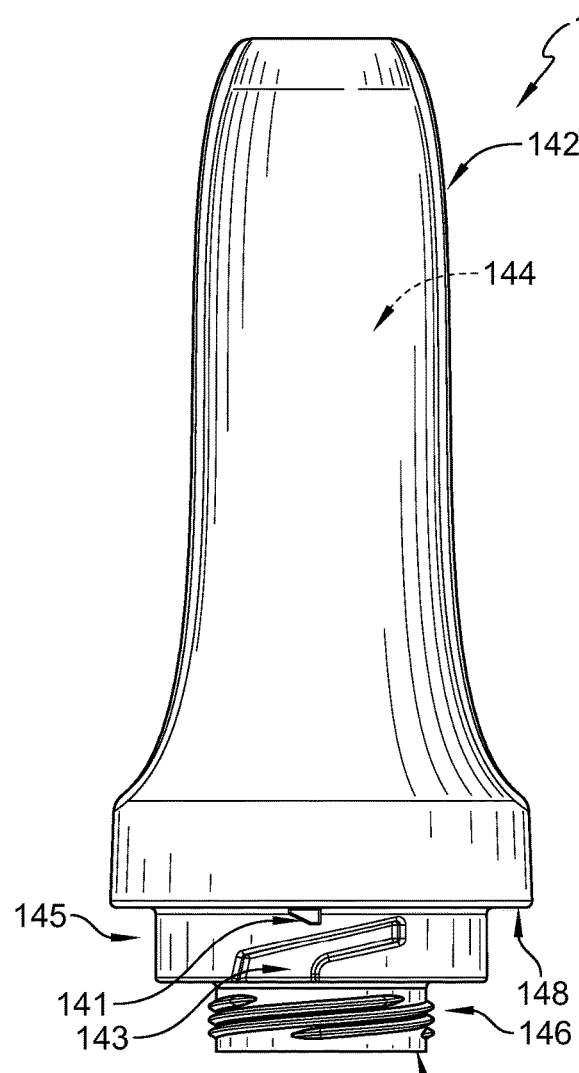
FIG. 19 is a side elevation of the container of FIG. 17 showing that a mount ring is coupled to the platform of the container and a neck is coupled to the mount ring for attachment of the lid to the container and suggesting that the mount ring is formed to include a groove for attachment of the overcap to the container.
Figure 20:
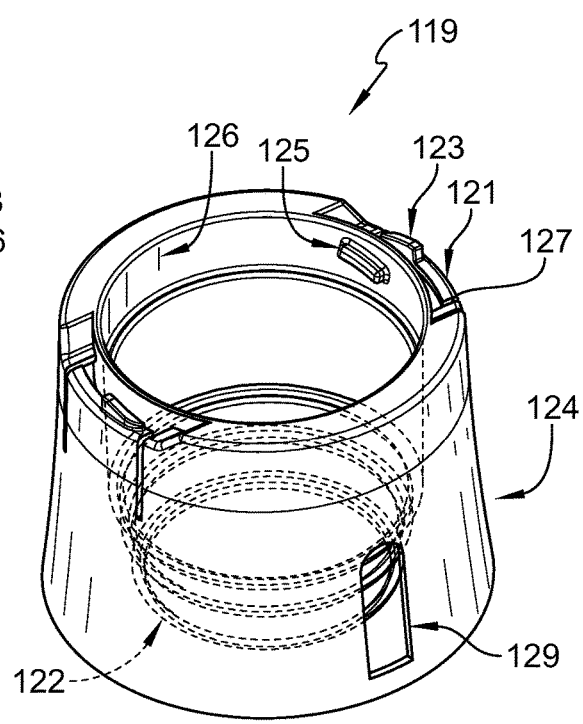
FIG. 20 is a perspective view of the overcap of FIG. 18 showing that a lug included in the overcap is arranged to extend radially inward from a mount-ring receiver of the overcap to extend into the groove for attachment of the overcap with the container.

Overcap 119 includes product-measuring cup 122 and a base wall 124 coupled to product-measuring cup 122 as shown in FIG. 18. Base wall 124 is formed to define a mount-ring receiver 126. Base wall 124 is also formed to include a fill-view aperture 129 to allow a user to view product-measuring cup 122 as product is dispensed into product-measuring cup 122 to allow a desired amount of product to be measured. Base wall 124 is configured to engage with a supporting surface to hold liquid dispenser 110 in an upright orientation.

Tab-mover walls 121 are coupled to base wall 124 such that gaps 127 are formed alongside edges of tab-mover walls 121 to allow tab-mover walls 121 to flex relative to base wall 124 as suggested in FIG. 18. Lock tabs 123 are coupled to tab-mover walls 121 to move therewith. Lugs 125 extend radially inward from mount-ring receiver 126 and are configured to extend into grooves 143 of mount ring 145 to mount overcap 119 onto container 112 as suggested in FIGS. 17-20.

Mount ring 145 extends into mount-ring receiver 126 and tab blockers 141 force lock tabs 123 radially inward as overcap 119 is coupled to container 112 as suggested in FIGS. 17-20. Lock tabs 123 engage with tab blockers 141 to form child-resistant lock 116 and block removal of overcap 119 at the selection of an adult user once overcap 119 reaches a closed position. An adult user releases child-resistant lock 116 by moving lock tab 123 radially inward to pass around tab blocker 141 and allow rotation of overcap 119 relative to container 112.

Figure 21:
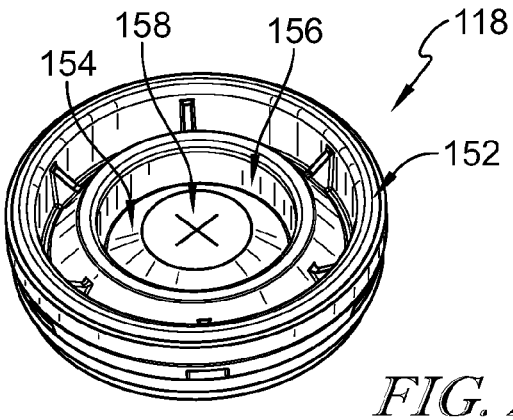
FIG. 21 is an upper perspective view of the valve of FIG. 16 showing that the valve includes a rim and a body coupled to the rim by a web and suggesting that the body is formed to include a pressure-released orifice moveable from a closed position to an opened position in response to increases in pressure in the container as a result of the user squeezing the container.

Valve 118 includes a rim 152 and a body 154 coupled to rim 154 by a web 156 as suggested in FIG. 21. Web 156 is flexible to allow body 154 to move relative to rim 152. Body 154 is formed to include a pressure-released orifice 158. Pressure-released orifice 158 is biased toward a closed position as shown in FIG. 21. Pressure-released orifice 158 is movable from the closed position to an opened position based on pressure increases within container 112 at the selection of a user to dispense product through pressure-released orifice 158.

Figure 22:
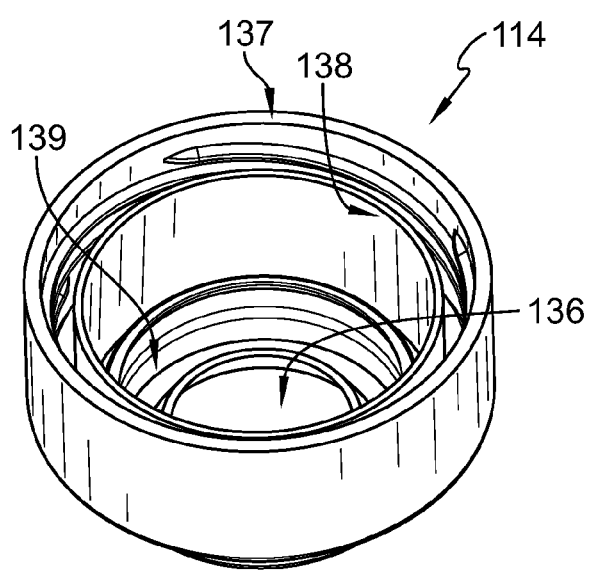
FIG. 22 is an upper perspective view of the lid of FIG. 16 showing that the lid is formed to include lid anchor for attachment of the lid to the container, a delivery aperture, and a valve receiver.
Figure 23:
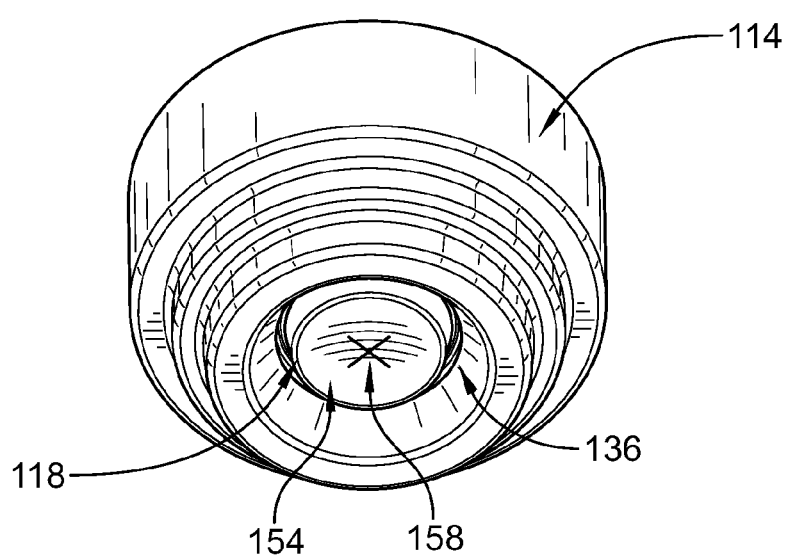
FIG. 23 is a lower perspective view of the lid of FIG. 22 showing the valve located in the valve receiver to cause the body of the valve to be aligned with the delivery aperture of the lid.

Lid 114 includes a lid anchor 137 and a valve receiver 139 as shown in FIG. 22. Lid anchor 137 is formed to include a dispense aperture 136 and configured to engage with neck 146 of container 112 to couple lid 114 to container 112 through corresponding engagement features, such as threads for example. Valve receiver 139 is configured to receive rim 152 of valve 118 to couple valve 118 with lid 114 as suggested in FIG. 23. Body 154 is aligned with dispense aperture 136 when valve 118 is coupled to lid 114.

Lid 114 is configured to mount on container 112 to hold valve 118 on container 112 over opening 147 as suggested in FIGS. 24 and 25. In one example, a gasket 162 is engaged with brim 149 of neck 146 and lid 114 to form a seal between container 112 and lid 114. In some embodiments, a plug wall 138 of lid 114 forms a plug seal with an inner surface of neck 146.

Overcap 119 is mounted on container 112 such that product dispensed through valve 118 is received in product-measuring cup 122 as suggested in FIGS. 24 and 25. In some embodiments, mount ring 145 forms a plug seal with mount-ring receiver 126 to block product dispensed into product-measuring cup 122 from passing out of overcap 119 while overcap 119 is mounted on container 112 in the closed position. In some embodiments, mount ring 145 engages with product-measuring cup 122 to seal around product-measuring cup 122 when overcap 119 is in the closed position. An adult user releases child-resistant lock 116 to allow removal of overcap 119 to deliver product dispensed into product-measuring cup 122 as suggested in FIG. 25.

In illustrative embodiments, container 112, lid 114, and overcap 119 are formed from plastics materials, such as polyethylene terephthalate, polypropylene, polyethylene, or polyvinyl chloride, combinations thereof, or any other suitable alternatives. In some embodiments, overcap 119 is formed from a transparent material to allow a user to see product-measuring cup 122 through base wall 124. In some embodiments, container 112 is printed or shrink wrapped to include indicia regarding the product. In some embodiments, valve 118 is formed of an elastomeric material, such as rubber for example.

Figures 26, 27:
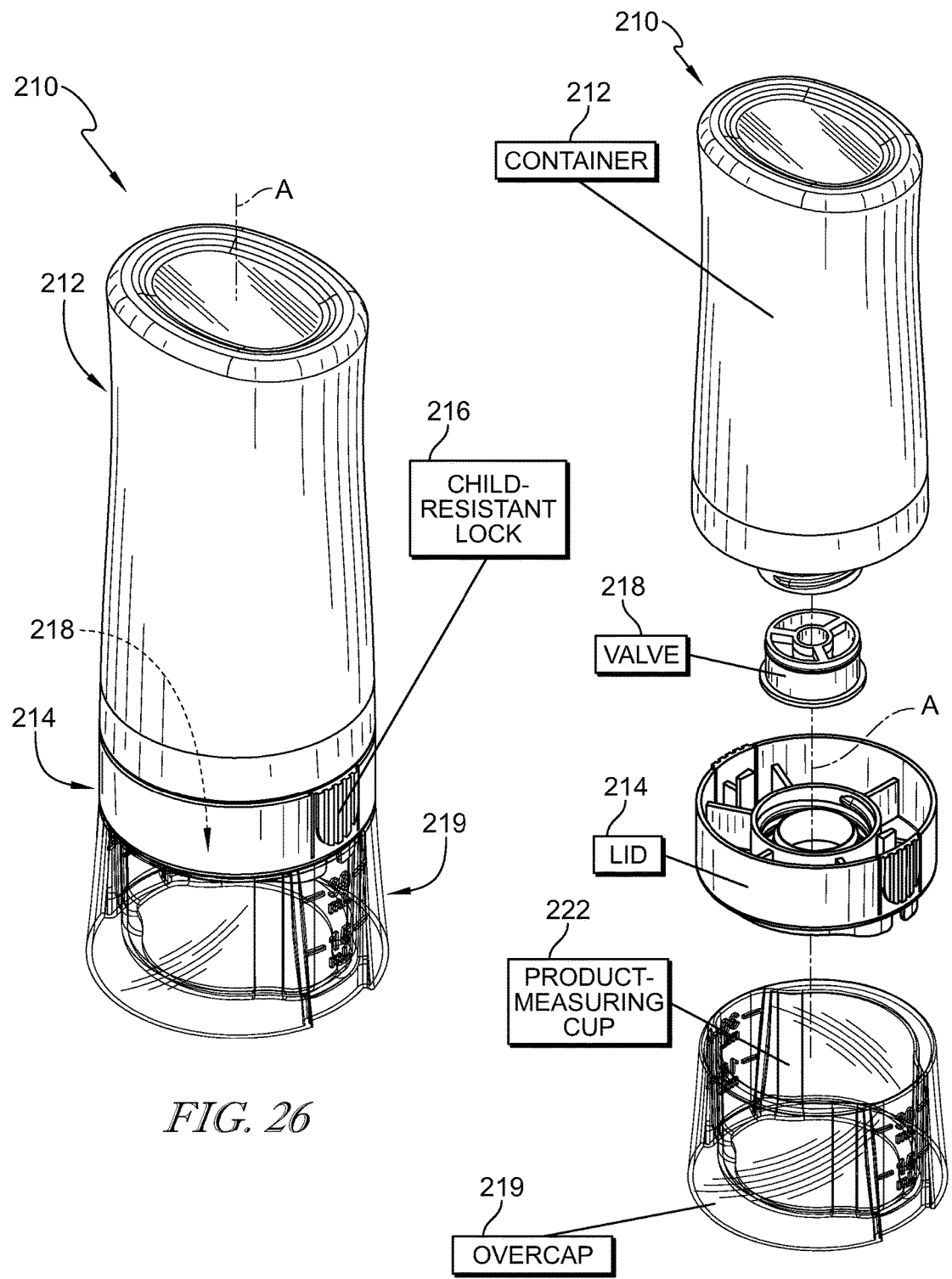
FIG. 26 is a perspective view of a third embodiment of a liquid dispenser in accordance with the present disclosure showing that the liquid dispenser includes a container, a lid mounted on the container, and an overcap mounted on the lid, and suggesting that the lid engages with a valve to block dispensing of a liquid product from the container when a child-resistant lock is engaged.
FIG. 27 is an exploded perspective view of the liquid dispenser of FIG. 26 showing the that the liquid dispenser includes, from top to bottom, the container, the valve, the lid, and the overcap.

Another embodiment of a liquid dispenser 210 in accordance with the present disclosure includes a container 212 and a lid 214 mounted on container 212 over a valve 218 as suggested in FIGS. 26 and 27. Lid 214 is rotatable relative to container 212 about an axis A to block or allow dispensing of liquid product stored in container 212 into an overcap 219. A child-resistant lock 216 blocks rotation of lid 214 at the selection of an adult user. Liquid product dispensed into a product-measuring cup 222 of overcap 219 is delivered by removing overcap 219 from lid 214. An adult user operates liquid dispenser 210 in a similar manner as that of liquid dispenser 10 shown in FIGS. 1-14.

Overcap 219 is configured to support liquid dispenser 210 in an upright position when overcap 219 is mounted on lid 214 as suggested in FIG. 26. An adult user releases child-resistant lock 216 and rotates container 212 relative to lid 214 to space valve 218 apart from lid 214. The user squeezes container 212 to dispense liquid product from container 212 into product-measuring cup 222 of overcap 219 to a desired level. The user removes overcap 219 from lid 214 to deliver the liquid product contained in product-measuring cup 222 to the user or another person for ingestion of the product, for example.

Figure 28:
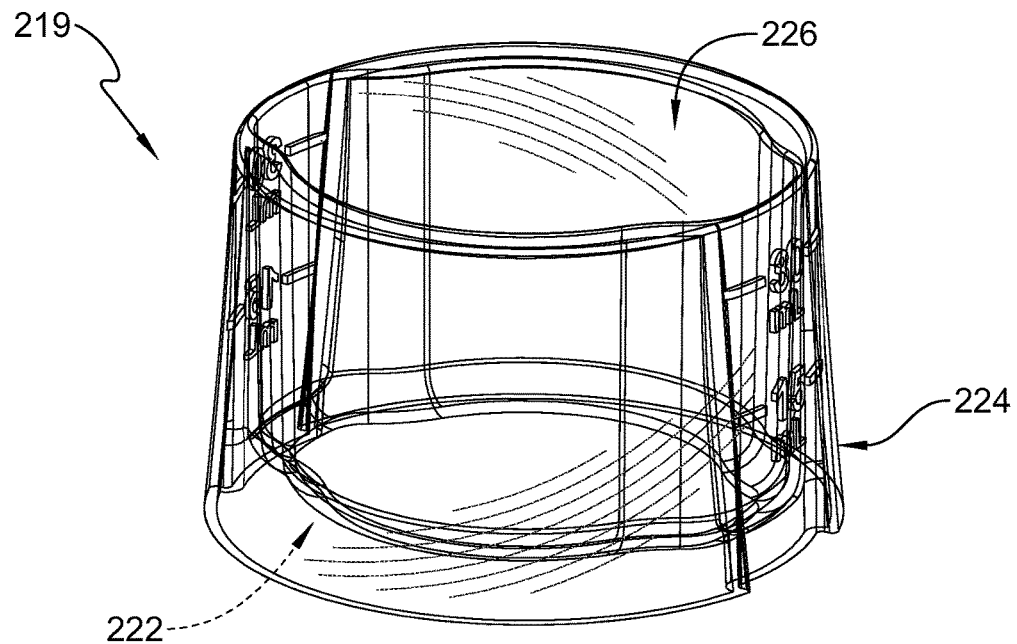
FIG. 28 is an enlarged perspective view of the overcap of FIG. 27 showing that the overcap includes a product-measuring cup and a base wall coupled to the product-measuring cup to support the product-measuring cup and liquid dispenser in an upright position when the overcap is mounted on the lid as suggested in FIG. 26.

Overcap 219 includes product-measuring cup 222 and a base wall 224 coupled to product-measuring cup 222 as shown in FIG. 28. Base wall 224 is formed to define a lid receiver 226. In one example, product-measuring cup 222 and base wall 224 are transparent to allow a user to view product-measuring cup 222 as product is dispensed into product-measuring cup 222 to allow a desired amount of product to be measured. Base wall 224 is configured to engage with a supporting surface to hold liquid dispenser 210 in an upright orientation.

Figure 29:
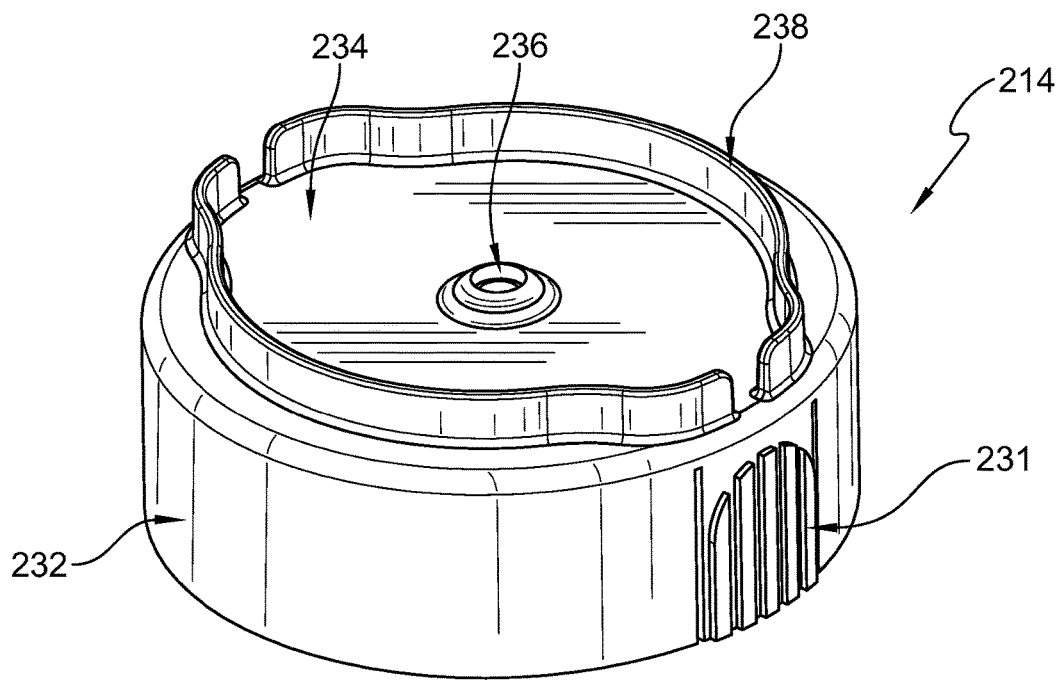
FIG. 29 is an enlarged perspective view of the lid of FIG. 27 showing that the lid includes a bottom wall formed to include a dispense aperture and a side wall coupled to the bottom to extend toward the container from the bottom wall.

Lid 214 includes a side wall 232 and a bottom wall 234 coupled to side wall 232 as shown in FIG. 29. Bottom wall 234 is formed to include a dispense aperture 236. Tab-mover walls 231 of child-resistant lock 216 are coupled to bottom wall 234 and spaced apart from side wall 232 to allow tab-mover walls 231 to flex relative to bottom wall 234 and move relative to side wall 232. In some embodiments, tab-mover walls 231 are formed to define grips configured to provide a grip surface for engagement of tab-mover walls 231 by a user.

Lid receiver 226 of overcap 219 is configured to receive cap-locator walls 238 coupled to bottom wall 234 of lid 214 as suggested in FIGS. 28 and 29. Cap-locator walls 238 are configured to engage with overcap 219 when overcap 219 is mounted on lid 214 to hold overcap 19 on lid 214 at the selection of a user. In some embodiments, cap-locator walls 238 form a plug seal with product-measuring cup 222 when overcap 219 is mounted on lid 214 to block product within product-measuring cup 222 from passing out of product-measuring cup 222 before overcap 219 is removed from lid 214.

Figures 30, 31:
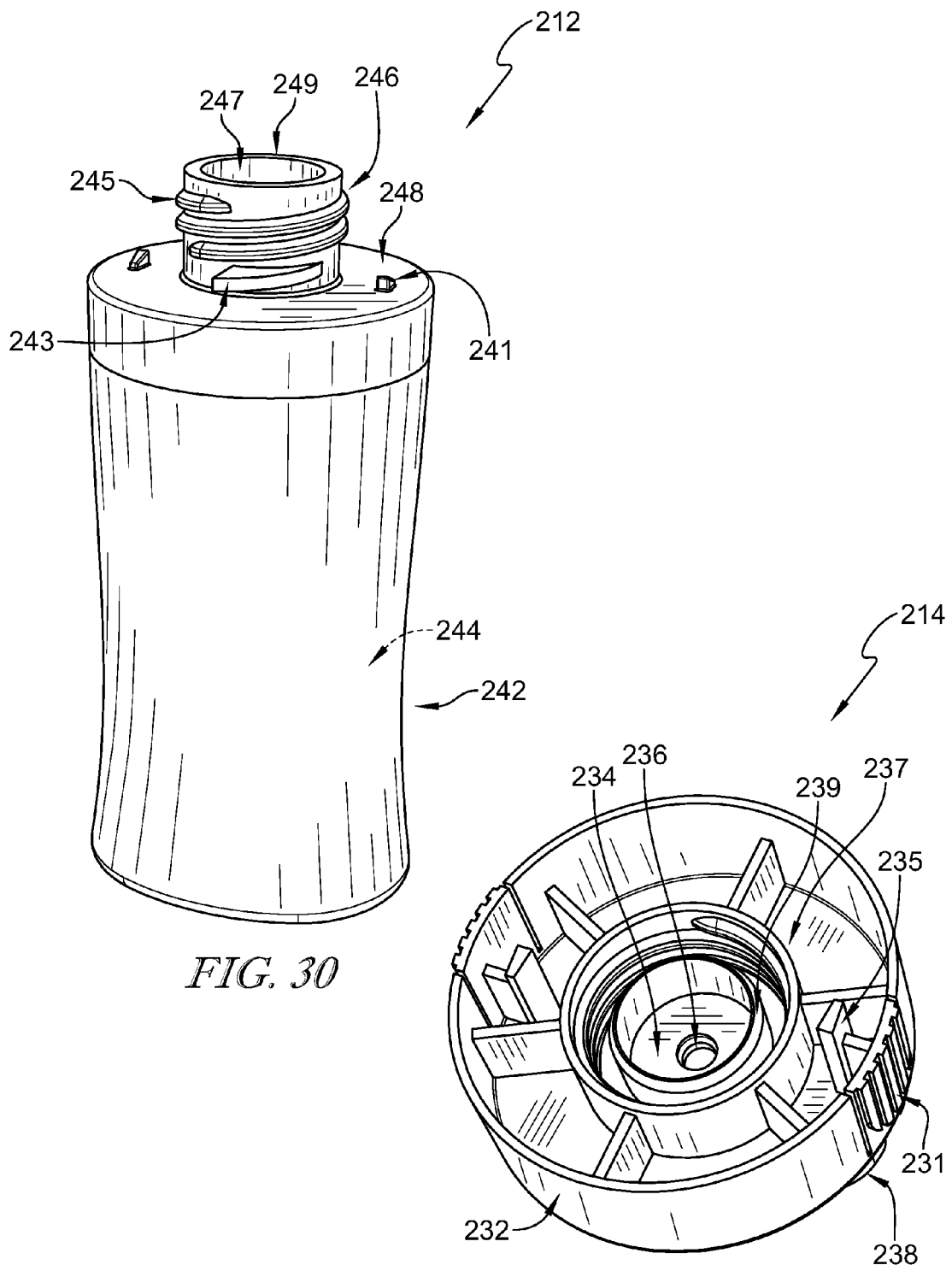
FIG. 30 is a perspective view of the container of FIG. 27 showing that the container includes a body and a neck coupled to a platform of the body and that a pair of tab blockers included in the child-resistant lock are coupled to the platform and arranged to lie in spaced-apart relation to one another to locate the neck therebetween.
FIG. 31 is an upper perspective view of the lid of FIG. 29 showing that the child-resistant lock further includes a pair tab-mover walls coupled to the bottom wall and spaced apart from the side wall to allow movement of the tab-mover walls relative to the side wall and a pair of lock tabs coupled to the tab-mover walls to move therewith.

Container 212 includes a body 242 formed to include an interior product-storage region 244 and a neck 246 coupled to body 242 as shown in FIG. 30. Body 242 of container 212 is formed to define a platform 248. Neck 246 is coupled to platform 248. A brim 249 of neck 246 defines an opening 247 arranged to open into interior product-storage region 244 of container 212. In one example, tab blockers 241 are coupled to platform 248 and spaced apart from neck 246. Lid-rotation limiters 243 extend radially outward from neck 246. In some embodiments, tab blockers 241 are coupled to neck 246. In some embodiments, lid-rotation limiters 243 are coupled to platform 248. Valve 218 is located in a space formed in neck 246 as suggested in FIG. 27. Lid 214 is coupled to neck 246 over valve 218 to trap valve 218 between lid 214 and body 242. Overcap 219 is coupled to lid 214 such that liquid product dispensed through lid 214 flows into product-measuring cup 222.

Lock tabs 235 are coupled to tab-mover walls 231 of lid 214 to move therewith as suggested in FIG. 31. A lid anchor 237 coupled to bottom wall 234 is configured to engage with neck 246 to mount lid 214 onto container 212 as suggested in FIGS. 30 and 31. In one example, threads 245 are coupled to neck 246 and configured to engage with corresponding threads of lid anchor 237. However, any other suitable attachment arrangements may be used in accordance with the present disclosure. A valve receiver 239 is also coupled to bottom wall 234 and configured to engage with valve 218 when lid 214 is mounted on container 212.

In one example, lid-rotation limiters 243 are configured to engage with lock tabs 235 to block removal of lid 214 from container 212 once lid 214 is coupled on container 212. Lid 214 is in an opened position to allow dispensing of liquid product when lock tabs 235 engage lid-rotation limiters 243. Tab blockers 241 are configured to move lock tabs 235 radially inward as lid 214 is further coupled onto container 212 and to engage lock tabs 235 to form child-resistant lock 216 when lid 214 reaches a closed position to block dispensing of liquid product.

Child-resistant lock 216 blocks rotation of lid 214 toward the opened position at the selection of an adult user. An adult user releases child-resistant lock 216 by moving lock tabs 235 radially inward to pass around tab blockers 241 and allow rotation of lid 214 toward the opened position. Valve 218 is similar to valve 18 of FIGS. 11-14 and is configured to engage with bottom wall 234 to cover dispense aperture 236 and block product from passing through dispense aperture 236 when lid 214 is in the closed position. Valve 218 is spaced apart from bottom wall 234 when lid 214 is in the opened position to allow product within interior product-storage region 244 of container 212 to pass through neck 246, valve 218, and dispense aperture 236 into product-measuring cup 222.

Another embodiment of a liquid dispenser 310 in accordance with the present disclosure includes a container 312 and a lid 314 mounted on container 312 over a valve 318 as suggested in FIGS. 32 and 33. Lid 314 is rotatable relative to container 312 about an axis A to block or allow dispensing of liquid product stored in container 312 into an overcap 319. A child-resistant lock 316 blocks rotation of lid 314 at the selection of an adult user. Liquid product dispensed into a product-measuring cup 322 of overcap 319 is delivered by removing overcap 319 from lid 314.

Overcap 319 is configured to support liquid dispenser 310 in an upright position when overcap 319 is mounted on lid 314 as suggested in FIG. 32. An adult user releases child-resistant lock 316 and rotates container 312 relative to lid 314 to unblock valve 318. The user squeezes container 312 to dispense liquid product from container 312 into product-measuring cup 322 of overcap 319 to a desired level. The user removes overcap 319 from lid 314 to deliver the liquid product contained in product-measuring cup 322 to the user or another person for ingestion of the product, for example. Overcap 319 is similar to overcap 219 shown in FIG. 28.

Container 312 includes a body 342 formed to include an interior product-storage region 344 and a neck 346 coupled to body 342 as shown in FIG. 34. Body 342 of container 312 is formed to define a platform 348. Neck 346 is coupled to platform 348. A brim 349 of neck 346 defines an opening 347 arranged to open into interior product-storage region 344 of container 312. In one example, tab blockers 341 are arranged on wings 343 coupled to neck 346. Tab blockers 341 are spaced apart from neck 346. In some embodiments, tab blockers 341 are coupled to platform 348.

Lid 314 includes a side wall 332 and a bottom wall 334 coupled to side wall 332 as shown in FIG. 35. Bottom wall 334 is formed to include a dispense aperture 336. A valve blocker 339 is coupled to bottom wall 334 and configured to flex relative to bottom wall 334. In one example, dispense aperture 336 and valve blocker 339 are offset from axis A as suggested in FIG. 33. Tab-mover walls 331 of child-resistant lock 316 are coupled to bottom wall 334 and spaced apart from side wall 332 to allow tab-mover walls 331 to flex relative to bottom wall 334 and move relative to side wall 332. In some embodiments, tab-mover walls 331 are formed to define grips configured to provide a grip surface for engagement of tab-mover walls 331 by a user.

Lock tabs 335 are coupled to tab-mover walls 331 of lid 314 to move therewith as suggested in FIG. 35. A lid anchor 337 coupled to bottom wall 334 is configured to engage with neck 346 to mount lid 314 onto container 312 as suggested in FIGS. 32 and 33. In one example, a flange 345 is coupled to neck 346 and configured to engage with lid anchor 337 as suggested in FIGS. 34 and 35. However, any other suitable attachment arrangements may be used in accordance with the present disclosure. In some embodiments, lid anchor 337 forms a snap fit with flange 345 to hold lid 314 on container 312.

An insert 311 is received in neck 346 of container 312 as suggested in FIGS. 33 and 34. Valve 318 is coupled to insert 311 as suggested in FIGS. 34 and 36. Insert 311 includes a closure wall 353 and an annular wall 352 extending from closure wall 353. In some embodiments, a rib 351 extends radially outward from annular wall 352 and is configured to engage and seal against an inner surface of neck 346 of container 312.

A valve seat 350 is coupled to closure wall 353 of insert 311 and configured to receive valve 318 as suggested in FIG. 36. Valve 318 is similar to valve 118 of FIGS. 15, 21, and 23-25. Valve seat 350 includes a cross member 355 and retention tabs 357. Cross member 355 is coupled to closure wall 353 and defines openings through insert 311. Cross member 355 is configured to support valve 318 along a top side thereof. Retention tabs 357 are coupled to closure wall 353 along a periphery of valve seat 350 and are configured to hold valve 318 in valve seat 350. In one example, valve seat 350 is offset from axis A as suggested in FIG. 33.

Figures 37, 38:
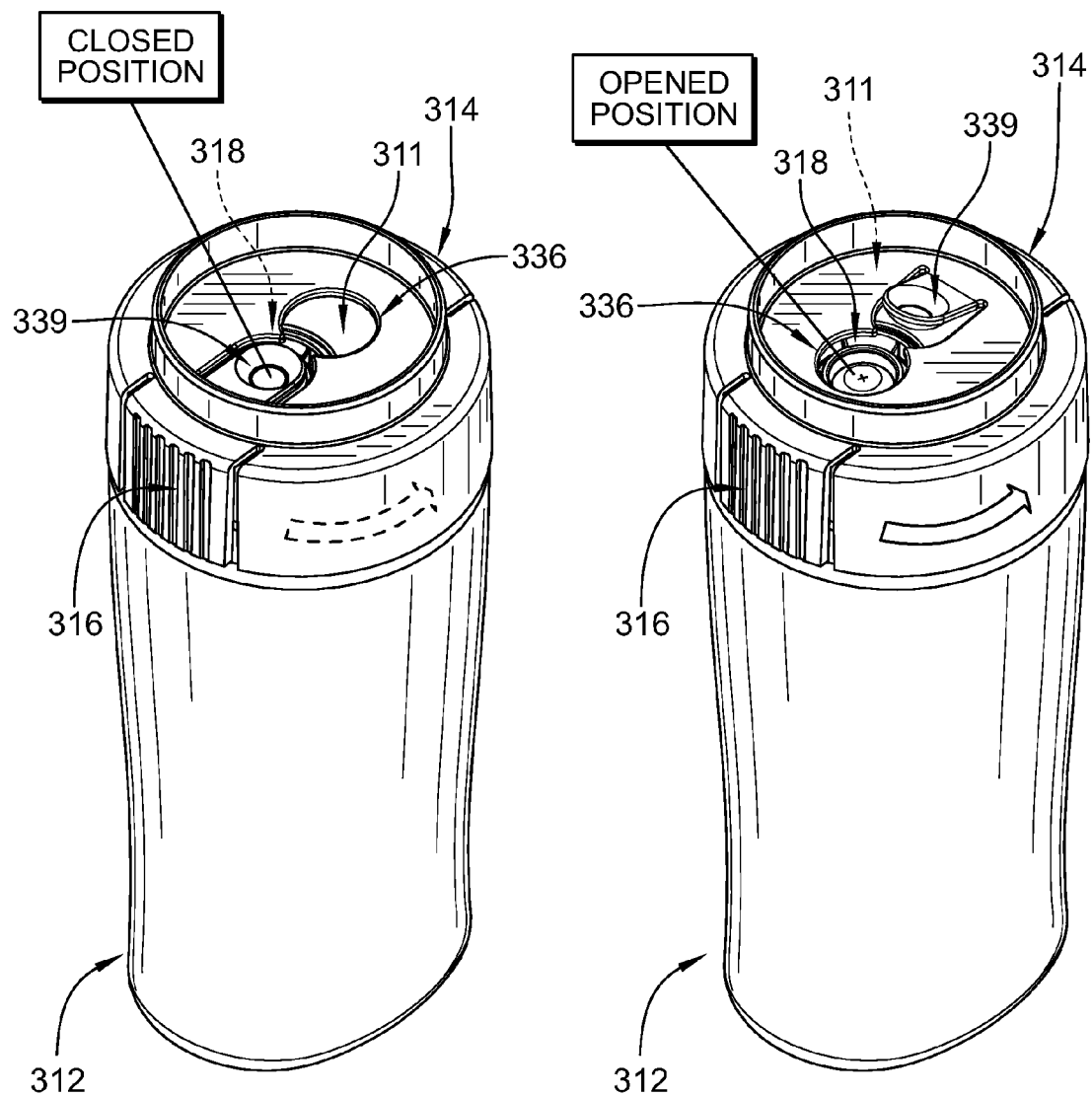
FIG. 37 is an upper perspective view of the container of FIG. 34 showing the lid mounted on the container in a closed position and suggesting that the valve blocker of the lid is positioned to trap the valve relative to the cross member of the valve seat to block dispensing of liquid product through the valve as suggested in FIG. 39.
FIG. 38 is a view similar to FIG. 37 showing the lid rotated relative to the container to align the dispense aperture with the valve to allow dispensing of liquid product and suggesting that the valve blocker moves relative to the bottom wall as the lid rotates relative to the container.

Lid 314 is coupled to neck 346 over valve 318 to trap valve 318 between lid 314 and insert 311 as suggested in FIGS. 37 and 38. Lid 314 is movable between an opened position (shown in FIG. 37) and a closed position (shown in FIG. 38) when mounted on container 312. Lid 314 is in an opened position to allow dispensing of liquid product when lid-rotation limiters 333 engage with tab blockers 341. Tab blockers 341 are configured to move lock tabs 335 radially inward as lid 314 is rotated toward the closed position and to engage lock tabs 335 to form child-resistant lock 316 when lid 314 reaches a closed position to block dispensing of liquid product.

Figures 39, 40:
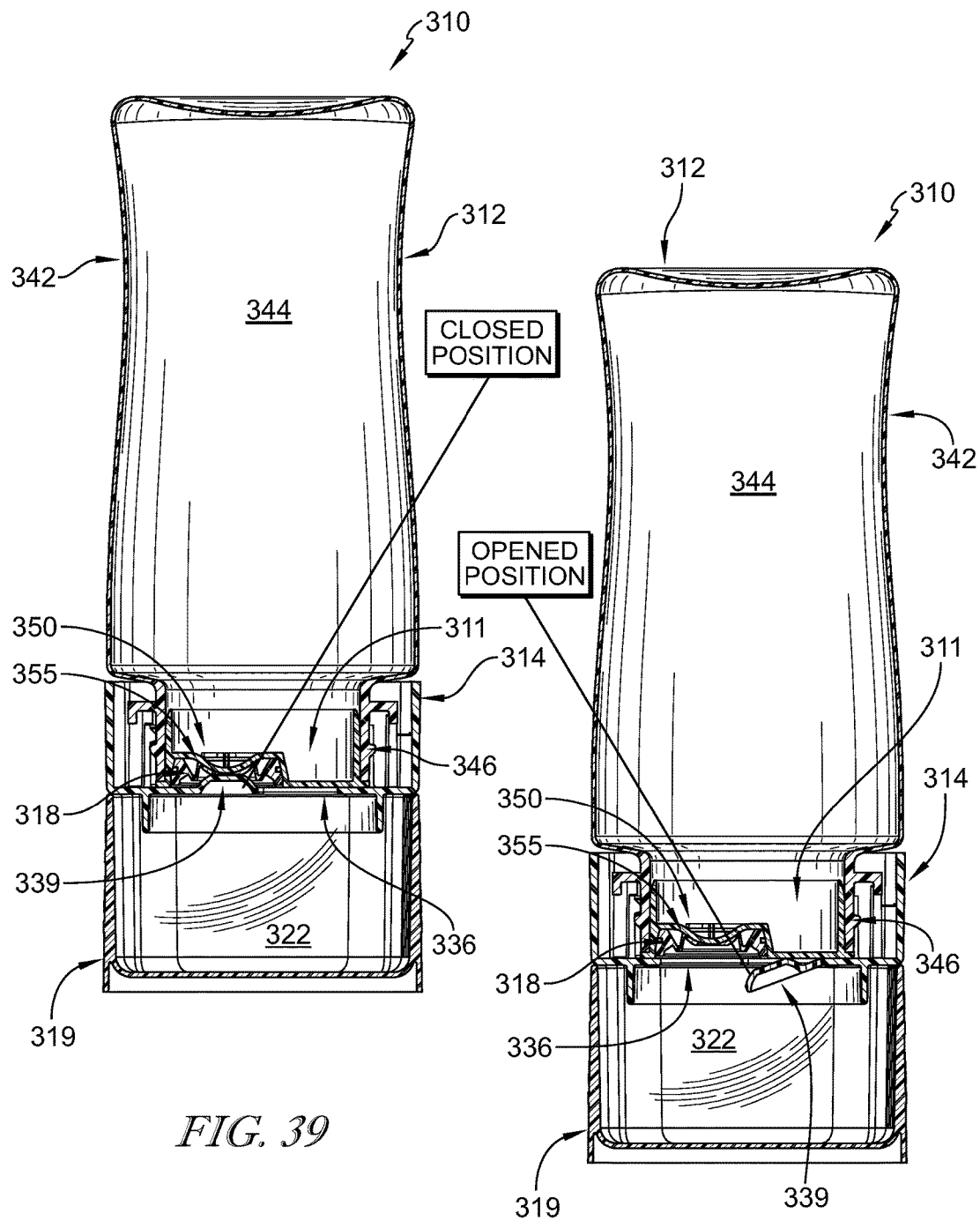
FIG. 39 is a sectional view take along line 39-39 in FIG. 32 showing the lid in the closed position in which the valve blocker is engaged with the valve to block dispensing of liquid product.
FIG. 40 is a view similar to FIG. 39 showing the lid in the opened position in which the valve blocker is spaced apart from the valve to allow liquid product to pass through the dispense aperture as a result of the lid being rotated relative to the container after an adult user releases the child-resistant lock.

Valve blocker 339 of lid 314 is positioned to trap valve 318 relative to insert 311 and block dispensing of liquid product through valve 318 when lid 314 is in the closed position as suggested in FIGS. 37 and 39. Rotation of lid 314 from the closed position to the opened position engages valve blocker 339 with insert 311 to flex valve blocker 339 relative to lid 314 as suggested in FIGS. 38 and 40. Dispense aperture 336 aligns with valve 318 when lid 314 is in the opened position to allow dispensing of liquid product.

Child-resistant lock 316 blocks rotation of lid 314 toward the opened position at the selection of an adult user as suggested in FIG. 33. An adult user releases child-resistant lock 316 by moving lock tabs 335 radially inward to pass around tab blockers 341 and allow rotation of lid 314 toward the opened position for dispensing of liquid product. Overcap 319 is coupled to lid 314 such that liquid product dispensed through lid 314 flows into product-measuring cup 322.

In illustrative embodiments, container 12, lid 14, valve 18, and overcap 19 are formed from plastics materials, such as polyethylene terephthalate, polypropylene, polyethylene, or polyvinyl chloride, combinations thereof, or any other suitable alternative. In some embodiments, overcap 19 is formed from a transparent material to allow a user to see product-measuring cup 22 through base wall 24. In some embodiments, container 12 is printed or shrink wrapped to include indicia regarding the product.

In illustrative embodiments, liquid dispenser 10, 110 allow for measured delivery of a product. The product can be in various states, such as liquid, semi-liquid, or flowable solid particles. The product can have various applications where measured dispensing is desired, such as medical or chemical.

A dispenser comprises a container, a lid, a valve, and an overcap. The container includes a body formed to include an interior product-storage region and a neck coupled to the body and formed to include an opening arranged to open into the interior product-storage region. The lid is coupled to the neck of the container to rotate relative to the container between an opened position and a closed position. The valve is coupled to the container and located in the opening between the container and the lid. The overcap is coupled to the lid to locate the lid between the container and the overcap. The lid is configured to block rotation of the lid from the closed positioned to the opened position to block dispensing of product out of the interior product-storage region of the container into the overcap at the selection of a user when the lid is mounted on the container.

A dispenser comprises a container, a lid, a valve, and an overcap. The container includes a body formed to include an interior product-storage region, a mount ring coupled to the body, and a neck coupled to the mount ring and formed to include an opening arranged to open into the interior product-storage region. The lid is coupled to the neck of the container to rotate relative to the container between an opened position and a closed position. The valve is coupled to the lid and located between the lid and the container. The valve is arranged to cover the opening and configured to move between a closed position blocking discharge of product from the interior product-storage region of the container and an opened position allowing discharge of product in response to an increase in pressure within the interior product-storage region at the selection of a user. The overcap is coupled to the mount ring of the container. The overcap is configured to block removal of the overcap from the container to block discharge of product from the interior product-storage region into a measuring cup of the overcap at the selection of a user when the overcap is mounted on the container.

A dispenser comprises a container, a valve, a lid, and an overcap. The container includes a body formed to include an interior product-storage region and a neck coupled to the body and formed to include an opening arranged to open into the interior product-storage region. The valve is located in the opening of the neck of the container. The lid is coupled to the neck of the container and arranged to overlie the valve. The lid includes a side wall and a bottom wall coupled to the side wall. The bottom wall is formed to include a dispense aperture. The overcap is coupled to the lid and configured to receive product dispensed through the dispense aperture of the lid. The lid moves relative to the container between an opened position in which the lid is spaced apart from the valve to allow product within the interior product-storage region of the container to pass through the dispense aperture and a closed position in which the valve engages the bottom wall to cover the dispense aperture to block product from passing through the dispense aperture.

A dispenser comprises a container, a lid, a valve, and an overcap. The container includes a body formed to include an interior product-storage region and a neck coupled to the body and formed to include an opening arranged to open into the interior product-storage region. The lid is coupled to the neck of the container to rotate relative to the container between an opened position and a closed position. The valve is coupled to the container and located in the opening between the container and the lid. The overcap is coupled to the lid to locate the lid between the container and the overcap. The lid is configured to provide means for blocking rotation of the lid from the closed positioned to the opened position to block dispensing of product out of the interior product-storage region of the container into the overcap at the selection of a user when the lid is mounted on the container.

A dispenser comprises a container, a lid, a valve, and an overcap. The container includes a body formed to include an interior product-storage region, a mount ring coupled to the body, and a neck coupled to the mount ring and formed to include an opening arranged to open into the interior product-storage region. The lid is coupled to the neck of the container to rotate relative to the container between an opened position and a closed position. The valve is coupled to the lid and located between the lid and the container. The valve is arranged to cover the opening and configured to move between a closed position blocking discharge of product from the interior product-storage region of the container and an opened position allowing discharge of product in response to an increase in pressure within the interior product-storage region at the selection of a user. The overcap is coupled to the mount ring of the container. The overcap is configured to provide means for blocking removal of the overcap from the container to block discharge of product from the interior product-storage region into a product-measuring cup of the overcap at the selection of a user when the overcap is mounted on the container.

The overcap is configured to provide means for communicating visually to a user an amount of liquid product discharged into the product-measuring cup so that the user can control an amount of liquid product discharged into the product-measuring cup. The overcap communicates visually to a user an amount of liquid product discharged into the product-measuring cup so that the user can control an amount of liquid product discharged into the product-measuring cup.

In one example of use, a liquid dispenser in accordance with the present disclosure begins in a closed position in which valve is blocked from dispensing liquid stored in the container. A user begins by engaging by engaging a pair of tab-mover walls to release the child-resistant lock. Once the child-resistant lock is disengaged, a user may then rotate the container to cause the valve to open. The user then squeezes the container to force liquid through the valve into the product-measuring cup. Once a desired amount of liquid has been discharged, the user then rotates the container in the opposite direction to close the valve so that leaks from the valve are minimized. The container and lid may then be separated from the product-measuring cup to allow use of the discharged liquid.

The invention claimed is:

1. A dispenser comprising
a container including a body formed to include an interior product-storage region and a neck coupled to the body and formed to include an opening arranged to open into the interior product-storage region,
a valve coupled to the container and located in the opening,
a lid coupled to the neck of the container to overlie the valve and configured to rotate relative to the container about an axis between an opened position and a closed position, the lid comprising a side wall, a bottom wall coupled to the side wall, the bottom wall is formed to include a dispense aperture, and a valve blocker coupled to the bottom wall, and
an overcap coupled to the lid to locate the lid between the container and the overcap,
wherein the lid is configured to block rotation of the lid from the closed positioned to the opened position at the selection of a user when the lid is mounted on the container,
wherein the valve blocker is engaged with the valve to block dispensing of product out of the interior product-storage region of the container into the overcap when the lid is in the closed position,
wherein the dispense aperture is aligned with the valve to allow dispensing of product out of the interior product-storage region of the container into the overcap when the lid is in the opened position,
further comprising an insert coupled to the neck of the container, wherein the valve is coupled to the insert and the insert is configured to carry the valve on the container,
wherein the insert includes a closure wall, an annular wall extending from the closure wall, and a valve seat coupled to the closure wall, and wherein the valve seat is configured to receive the valve therein, and
wherein the valve seat includes a cross member defining openings through the insert and retention tabs configured to hold the valve in the valve seat.

2. The dispenser of claim 1, wherein the overcap includes a product-measuring cup and a base wall coupled to the product-measuring cup, and wherein the base wall is configured to support the container in an upright position when the overcap is coupled to the lid.

3. A dispenser comprising
a container including a body formed to include an interior product-storage region and a neck coupled to the body and formed to include an opening arranged to open into the interior product-storage region,
a valve coupled to the container and located in the opening,
a lid coupled to the neck of the container to overlie the valve and configured to rotate relative to the container about an axis between an opened position and a closed position, the lid comprising a side wall, a bottom wall coupled to the side wall, the bottom wall is formed to include a dispense aperture, and a valve blocker coupled to the bottom wall, and
an overcap coupled to the lid to locate the lid between the container and the overcap, wherein the lid is configured to block rotation of the lid from the closed positioned to the opened position at the selection of a user when the lid is mounted on the container, wherein the valve blocker is engaged with the valve to block dispensing of product out of the interior product-storage region of the container into the overcap when the lid is in the closed position, and wherein the dispense aperture is aligned with the valve to allow dispensing of product out of the interior product-storage region of the container into the overcap when the lid is in the opened position, wherein the valve blocker is configured to flex relative to the bottom wall in response to rotation of the lid from the closed position to the open position and wherein the valve blocker is offset from the valve when the lid is rotated from the closed position to the opened position.

4. The dispenser of claim 3, wherein the overcap includes a product-measuring cup and a base wall coupled to the product-measuring cup, and wherein the base wall is configured to support the container in an upright position when the overcap is coupled to the mount ring.

5. The dispenser of claim 4, wherein a tab blocker is coupled to the container and a lock tab is coupled to the overcap, and wherein the tab blocker engages with the lock tab to block rotation of the overcap to block removal of the overcap from the container at the selection of a user.

6. The dispenser of claim 5, wherein the overcap further includes a tab-mover wall coupled to the base wall, wherein the lock tab is coupled to the tab-mover wall, and wherein the tab-mover wall is configured to flex relative to the base wall to move the lock tab relative to the tab blocker.

7. The dispenser of claim 3, further comprising an insert coupled to the neck of the container, wherein the valve is coupled to the insert and the insert is configured to carry the valve on the container.

8. The dispenser of claim 7, wherein the insert includes a closure wall, an annular wall extending from the closure wall, and a valve seat coupled to the closure wall, and wherein the valve seat is configured to receive the valve therein.

9. The dispenser of claim 8, wherein the valve blocker, the dispense aperture, and the valve seat are offset from the axis.

10. The dispenser of claim 9, wherein the valve blocker is arranged to trap the valve relative to the insert when the lid is in the closed position.

11. The dispenser of claim 3, wherein a tab blocker is coupled to the container and a lock tab is coupled to the lid, and wherein the tab blocker engages with the lock tab to block rotation of the lid from the closed position to the opened position at the selection of a user.

12. The dispenser of claim 11, wherein a lid-rotation limiter is coupled to the lid and configured to engage with the container to limit rotation of the lid relative to the container when the lid reaches the opened position.

* * * * *